(12) United States Patent
Gotkhindikar

(10) Patent No.: US 11,294,857 B2
(45) Date of Patent: Apr. 5, 2022

(54) MANAGING FILES ACCORDING TO CATEGORIES

(71) Applicant: Rubrik, Inc., Palo Alto, CA (US)

(72) Inventor: Chaitanya Sudhakar Gotkhindikar, Ejipura (IN)

(73) Assignee: Rubrik, Inc., Palo Alto, CA (US)

( * ) Notice: Subject to any disclaimer, the term of this patent is extended or adjusted under 35 U.S.C. 154(b) by 279 days.

(21) Appl. No.: 16/669,657

(22) Filed: Oct. 31, 2019

(65) Prior Publication Data
US 2021/0133147 A1    May 6, 2021

(51) Int. Cl.
| | |
|---|---|
| *G06F 16/20* | (2019.01) |
| *G06F 16/11* | (2019.01) |
| *G06F 16/23* | (2019.01) |
| *G06F 16/27* | (2019.01) |
| *G06F 11/14* | (2006.01) |
| *G06F 16/2457* | (2019.01) |

(52) U.S. Cl.
CPC ........ *G06F 16/128* (2019.01); *G06F 11/1451* (2013.01); *G06F 11/1461* (2013.01); *G06F 16/2358* (2019.01); *G06F 16/24578* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 9,430,320 B1* | 8/2016 | Li | ........................ G06F 11/1016 |
| 9,639,701 B1* | 5/2017 | Barajas Vargas | ....... G06F 21/78 |
| 2015/0278024 A1* | 10/2015 | Barman | .............. G06F 11/1466 |
| | | | 707/634 |

* cited by examiner

*Primary Examiner* — Belix M Ortiz Ditren
(74) *Attorney, Agent, or Firm* — Schwegman Lundberg & Woessner, P.A.

(57) ABSTRACT

According to various embodiments, with respect to a target set of files being managed (e.g., protected by data snapshots), each file in the target set of files is classified into one of two or more filesets (discontiguous filesets), where each of these filesets comprises one or more files that are related to each other by one or more factors, such as frequency of file change or purpose of existence (e.g., used by a software application). Once classified, files within the target set of files can be uniquely processed by a data management operation (e.g., incremental data snapshot process) according to their association to a discontiguous fileset.

20 Claims, 11 Drawing Sheets

MANAGING FILES ACCORDING TO CATEGORIES

TECHNICAL FIELD

Embodiments described herein relate to managing data and, more particularly, to systems, methods, devices, and machine-readable media for managing files (e.g., as filesets) based on categories.

BACKGROUND

Conventional file management (e.g., for backup and recovery) usually involves grouping files according to hierarchical relationships and, more specifically, according to location of files (e.g., in a directory hierarchy provided by a filesystem). For instance, on a client computing device, a user can configure a data backup and recovery service to protect a set of files (also referred to as a fileset) that comprises an entire root file system (e.g., all files starting from the root directory ("/") of the client file system). This service can be further configured by the user to protect the user-specified fileset according to a backup policy (e.g., as defined by a service level agreement (SLA) between the user and a third-party data backup service provider), which can define how frequently a data snapshot (e.g., full or incremental) of the user-specified fileset will be generated for data protection.

At a high level, a traditional process for generating an incremental data snapshot involves: (a) a scan phase where metadata (e.g., by a stat( ) system call) for each file that is targeted for data backup protection is obtained (e.g., fetched) to determine which files have experienced a data block change or a file metadata change since the last data snapshot; and (b) a backup phase where data from those files (in the fileset) that have experienced a data block change or a file metadata change is obtained and stored (e.g., as delta data) as part of the incremental data snapshot. Generally, the time taken to perform the scan phase is usually directly proportional to the number of files. This can make it undesirable to perform a traditional process for generating an incremental data snapshot on certain filesets, such as a fileset defined as the root directory of a filesystem (e.g., of a virtual machine or a client computing device), where the fileset covers a lot of files and a large number of those files remain unchanged between consecutive data snapshots.

BRIEF DESCRIPTION OF THE DRAWINGS

Various ones of the appended drawings merely illustrate various embodiments of the present disclosure and should not be considered as limiting its scope. To easily identify the discussion of any particular element or act, the most significant digit or digits in a reference number refer to the figure ("FIG.") number in which that element or act is first introduced.

DETAILED DESCRIPTION

Figure 1A:
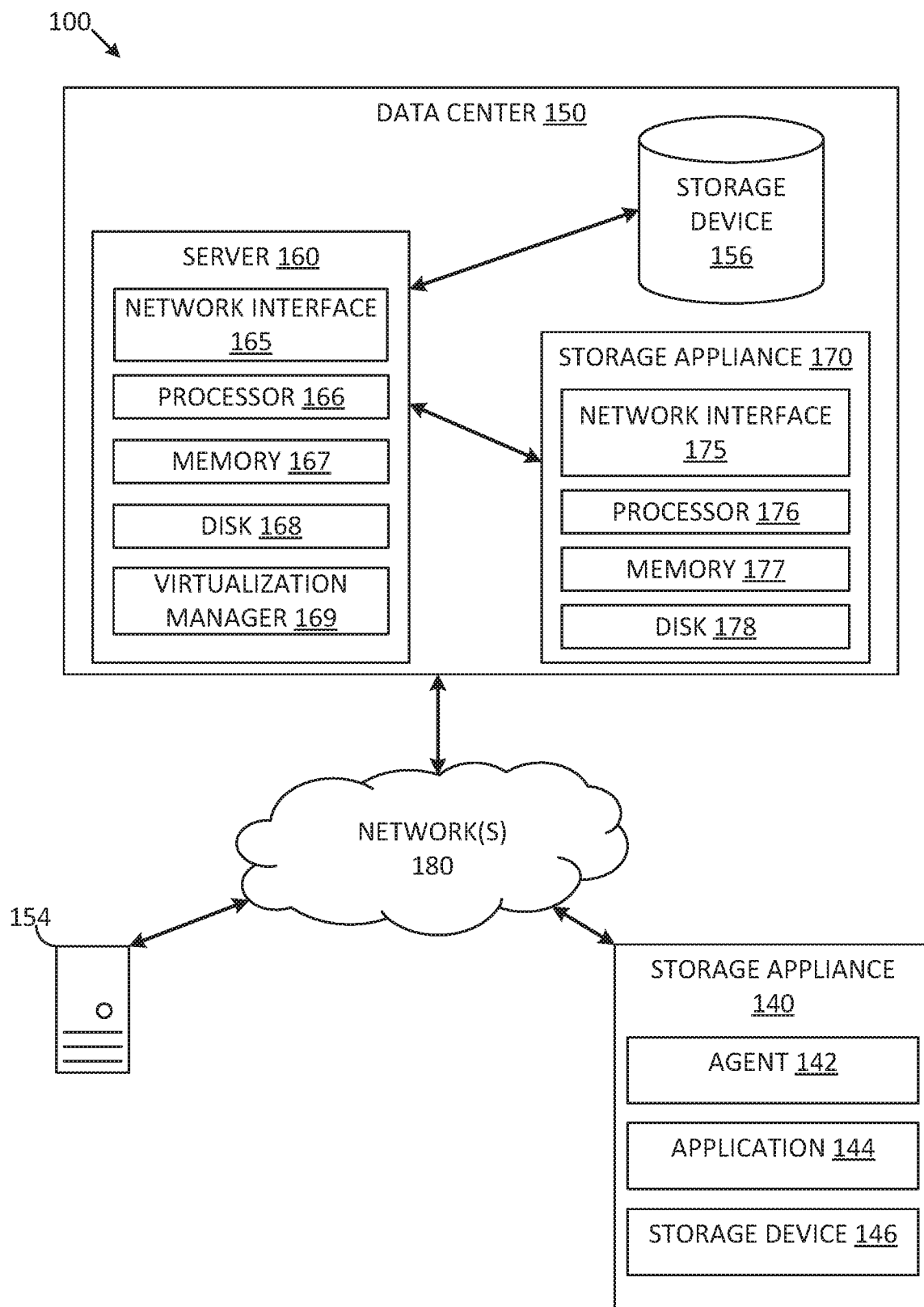
FIG. 1A is a block diagram illustrating an example networked computing environment in which some embodiments described herein are practiced.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed herein, conventional file management can involve grouping files according to hierarchical relation (e.g., based on directory hierarchy), and the time taken to perform a traditional process for generating an incremental data snapshot of a fileset can be wasteful when the fileset covers a lot of files and a large number of those files remain unchanged between consecutive data snapshots (e.g., full or incremental data snapshots). For example, a fileset covering a typical operating system's root filesystem can comprise a very large number of files, and this large number of files can take time for a scan phase of a traditional incremental data snapshot process to process. This can be a waste of time given that portions of such a fileset remain unchanged between consecutive data snapshots.

Various embodiments described herein address the deficiencies of traditional classification of files in filesets and performing traditional processes for generating incremental data snapshots of filesets. According to various embodiments, with respect to a target set of files being managed (e.g., protected by data snapshots), each file in the target set of files is classified into one of two or more filesets (also referred herein to as discontiguous filesets), where each of these filesets comprises one or more files that are related to each other by one or more factors, such as frequency of file change or purpose of existence (e.g., used by a software application). Once classified, files within the target set of files can be uniquely processed by a data management operation (e.g., incremental data snapshot process) according to their association to a discontiguous fileset (e.g., rather than being processed according to their location within a directory hierarchy).

The factors used to determine relation of two or more files can include, without limitation, the frequency of data changes (e.g., data block changes or file metadata changes) experienced by the two or more files over time (e.g., over a sample space of x number of prior data snapshots), or common purpose of existence of the two or more files. For instance, a certain set of files can be co-related if one or more software applications change data content in the certain set of files more frequently than other files. As another instance, with respect to an operating system environment, files can be installed using packages and those package files can represent a set of files that are related to each other by a common purpose (e.g., associated with use by a software application installed by a package). For some embodiments, files of a certain discontiguous fileset can be related by one or more factors that do not include hierarchical relation (e.g., the one or more factors can exclude location of files within a directory hierarchy).

For some embodiments, to classify each file in a target set of files into a discontiguous fileset, each file in the target set of files is ranked based on one or more factors, where files having a rank that falls into a similar range of ranks can be considered related and can be grouped into a common discontiguous fileset. The rank of a file can be determined, for example, by how often the data content of the given file changed over time (e.g., over a sample space of x number of prior data snapshots), by the significance of the given file to a software application that is using (e.g., consuming) the given file, or by some combination thereof. For instance, a given software application that uses (e.g., consumes) files from a target set of files can be associated with a significance rank, which can be considered in the ranking of any file (from the target set of files) that is used by the given software application. The significance rank of a software application can, for example, range from 1 to n. For this example range, 1 can represent either most or least significant rank in the range, and s can be determined by the number of software applications being considered with respect to the target set of applications. For instance, s can be equal to m+1, where m number of known software applications are being considered. The significance rank of s can represent the lowest significance rank, and can be the default rank for software applications that are unknown or not considered important.

For some embodiments, a plurality of fileset classes that represent different discontiguous filesets are used to categorize (by fileset class association) files from a target set of files into the different discontiguous filesets. For example, an embodiment can use (e.g., define) three fileset classes (e.g., fileset classes A, B, and C) for classifying files from a target set of files into three different discontiguous filesets. For instance, based on the rank of a given file, the given file can be associated with fileset class A if it has a rank ranging from 50 to 100, associated with fileset class B if it has a rank ranging from 10 to less than 50, and associated with fileset class C if it has a rank ranging from 0 to less than 10. For purposes of data management (e.g., data protection via data snapshots), a file associated with fileset class A can be considered more important for data management (e.g., data protection) than any file associated with fileset class B, and a file associated with fileset class B can be considered more important for data management than any file associated with fileset class C. At the beginning of data managing (e.g., data protecting) a target set of files, all files in the target set of files can be associated with a default fileset class (e.g., one of fileset classes A, B, or C). Eventually, over time (e.g., generation of incremental data snapshots), the rank of each of the files (in the target set of files) can be periodically determined (e.g., updated prior to generation of a new incremental data snapshot) and the files can be re-classified (e.g., demoted or promoted) from the default fileset class to another fileset class based on the newly determined (e.g., updated) rank. For some embodiments, each file is initially associated with class A, and can eventually be associated with another class (e.g., B or C) by a process that periodically ranks and classifies (e.g., re-ranks and re-classifies) files to fileset classes. Depending on the embodiment, the process of periodically ranking and classifying files to fileset classes can begin after minimum amount of time has passed. For instance, the process of periodically ranking and classifying files to fileset classes can begin after a minimal number of incremental data snapshots have been generated, thereby providing a sufficient sample size upon which to determine the ranking of files (e.g., based on the factor of frequency of data content change).

According to various embodiments, a data management operation is performed differently, or at a different frequency, with respect to each discontiguous fileset. For example, for some embodiments, a data snapshot is generated at a different frequency for each of the discontiguous filesets. For example, with respect to the three discontiguous filesets represented by fileset classes A, B, and C, an embodiment can generate an incremental data snapshot for (or perform some other data management operation on) files in the discontiguous fileset of the fileset classes A every 1 hour, for files in the discontiguous fileset of the fileset classes B every 12 hours, and files in the discontiguous fileset of the fileset classes C at a frequency of every 24 hours. Depending on the embodiments, the frequency of at least one of the fileset classes (e.g., A, B, or C) can be defined according to a service level agreement (SLA) between a service provider (e.g., organization providing the data snapshot service) and a client (e.g., user or organization that owns the target set of files). For some embodiments, a data snapshot frequency of a single fileset class is defined (e.g., by a pre-defined or custom defined SLA that provides a frequency guarantee) as a base frequency, and the remaining fileset classes are automatically defined relative to that single fileset class. For instance, where fileset class B serves as a base frequency for generating data snapshot (e.g., incremental data snapshot), the data snapshot generation frequency of fileset class A can be defined to be a constant x more frequent than the base frequency of fileset class B, while the data snapshot generation frequency of fileset class C can be defined to be a constant y less frequent than the base frequency of fileset class B. For some embodiments, data protection for all files initially starts with a base data snapshot frequency defined by an SLA that is standard or custom defined and, eventually, each of the discontiguous filesets has a different data snapshot frequency.

As used herein, a fileset can comprise a set of files within a file system. For some embodiments, the set of files associated with a given fileset is not necessarily defined by location of files within a directory hierarchy. As used herein, a discontiguous fileset comprises a set of files that are related to each other based on the frequency by which the files experience data block changes or file metadata changes (e.g., data updates) or based on the common purpose of those files. For instance, a first fileset can comprise one or more files associated with a user software application of high importance to a user, while a second fileset can comprise one or more files that experience data updates every couple of minutes (e.g., every 5 minutes).

As used herein, a data snapshot (or also referred to as just a "snapshot") can comprise a storage snapshot of a set of files stored on a filesystem, such as one associated with a virtual machine (e.g., all the files from the root directory of the virtual machine). A data snapshot can capture a state of the set of files at a particular point in time. A data snapshot can either be a full data snapshot of the set of files, or an incremental data snapshot of the set of files. A full data snapshot can comprise a full data image (e.g., full copies) of a set of files. A full data snapshot can serve as an anchor snapshot for a snapshot chain that comprises one or more incremental data snapshots. An incremental data snapshot can be generated based on (e.g., relative to) a previously generated full data snapshot that serves as its base (e.g., anchor snapshot).

Though various embodiments are described herein with respect to using ranking and classification of files into discontiguous filesets for data snapshot purposes, for some embodiments, the ranking and classification of files described herein can be used with other data management operations, such as how the files are stored or determining which computing devices (e.g., in a data center) are used to store or process the files.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1A is a block diagram illustrating an example networked computing environment 100 in which some embodiments described herein are practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices can include, for example, a mobile computing device, a non-mobile computing device, a server, a workstation, a laptop computer, a tablet computer, a desktop computer, or an information processing system. The other storage devices can include, for example, a storage area network storage device, a networked-attached storage device, a hard disk drive, a solid-state drive, or a data storage system.

The data center 150 can include one or more servers, such as server 160, in communication with one or more storage devices, such as storage device 156. The one or more servers can also be in communication with one or more storage appliances, such as storage appliance 170. The server 160, storage device 156, and storage appliance 170 can be in communication with each other via a networking fabric connecting servers and data storage units within the data center 150 to each other. The storage appliance 170 can include a data management system for backing up virtual machines and/or files within a virtualized infrastructure. The server 160 can be used to create and manage one or more virtual machines associated with a virtualized infrastructure.

The one or more virtual machines can run various applications, such as a cloud-based service, a database application or a web server (e.g., a web server hosting an auto-parts website). The storage device 156 can include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, can include thousands of servers and/or data storage devices in communication with each other. The data storage devices can comprise a tiered data storage infrastructure (or a portion of a tiered data storage infrastructure). The tiered data storage infrastructure can allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 can include a secure network such as an enterprise private network, an unsecure network such as a wireless open network, a local area network (LAN), a wide area network (WAN), and the Internet. The one or more networks 180 can include a cellular network, a mobile network, a wireless network, or a wired network. Each network of the one or more networks 180 can include hubs, bridges, routers, switches, and wired transmission media such as a direct-wired connection. The one or more networks 180 can include an extranet or other private network for securely sharing information or providing controlled access to applications or files.

A server, such as server 160, can allow a client to download information or files (e.g., executable, text, application, audio, image, or video files) from the server 160 or to perform a search query related to particular information stored on the server 160. In some cases, a server can act as an application server or a file server. In general, a server can refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 can include a wireless network interface and/or a wired network interface. Processor 166 allows server 160 to execute computer readable instructions stored in memory 167 in order to perform processes described herein. Processor 166 can include one or more processing units, such as one or more CPUs and/or one or more GPUs. Memory 167 can comprise one or more types of memory (e.g., RAM, SRAM, DRAM, ROM, EEPROM, Flash, etc.). Disk 168 can include a hard disk drive and/or a solid-state drive. Memory 167 and disk 168 can comprise hardware storage devices.

The virtualization manager 169 can manage a virtualized infrastructure and perform management operations associated with the virtualized infrastructure. The virtualization manager 169 can manage the provisioning of virtual machines running within the virtualized infrastructure and provide an interface to computing devices interacting with the virtualized infrastructure. In one example, the virtualization manager 169 can set a virtual machine into a frozen state in response to a snapshot request made via an application programming interface (API) by a storage appliance, such as storage appliance 140 or storage appliance 170. Setting the virtual machine into a frozen state can allow a point in time snapshot of the virtual machine to be stored or transferred. In one example, updates made to a virtual machine that has been set into a frozen state can be written to a separate file (e.g., an update file) while the virtual disk file associated with the state of the virtual machine at the point in time is frozen. The virtual disk file can be set into a read-only state to prevent modifications to the virtual disk file while the virtual machine is in the frozen state. The virtualization manager 169 can then transfer data associated with the virtual machine (e.g., an image of the virtual machine or a portion of the image of the virtual machine) to a storage appliance in response to a request made by the storage appliance. After the data associated with the point in time snapshot of the virtual machine has been transferred to the storage appliance, the virtual machine can be released from the frozen state (i.e., unfrozen) and the updates made to the virtual machine and stored in the separate file can be merged into the virtual disk file. The virtualization manager 169 can perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer-readable instructions stored in memory 177 in order to perform processes described herein. Processor 176 can include one or more processing units, such as one or more CPUs and/or one or more GPUs. Memory 177 can comprise one or more types of memory (e.g., RAM, SRAM, DRAM, ROM, EEPROM, NOR Flash, NAND Flash, etc.). Disk 178 can include a hard disk drive and/or a solid-state drive. Memory 177 and disk 178 can comprise hardware storage devices.

In one embodiment, the storage appliance 170 can include four machines. Each of the four machines can include a multi-core CPU, 64 GB of RAM, a 400 GB SSD, three 4 TB HDDs, and a network interface controller. In this case, the four machines can be in communication with the one or more networks 180 via the four network interface controllers. The four machines can comprise four nodes of a server cluster. The server cluster can comprise a set of physical machines that are connected together via a network. The server cluster can be used for storing data associated with a plurality of virtual machines, such as backup data associated with different point-in-time versions of thousands of virtual machines.

The networked computing environment 100 can provide a cloud computing environment for one or more computing devices. Cloud computing can refer to Internet-based computing, wherein shared resources, software, and/or information can be provided to one or more computing devices on-demand via the Internet. The networked computing environment 100 can comprise a cloud computing environment providing Software-as-a-Service (SaaS) or Infrastructure-as-a-Service (IaaS) services. SaaS can refer to a software distribution model in which applications are hosted by a service provider and made available to end users over the Internet. In one embodiment, the networked computing environment 100 can include a virtualized infrastructure that provides software, data processing, and/or data storage services to end users accessing the services via the networked computing environment 100. In one example, networked computing environment 100 can provide cloud-based work productivity or business-related applications to a computing device, such as computing device 154.

The storage appliance 140 can comprise a cloud-based data management system for backing up virtual machines and/or files within a virtualized infrastructure, such as virtual machines running on server 160 or files stored on server 160 (e.g., locally stored files, files stored in mounted directories), according to some embodiments.

In some cases, networked computing environment 100 can provide remote access to secure applications and files stored within data center 150 from a remote computing device, such as computing device 154. The data center 150 can use an access control application to manage remote access to protected resources, such as protected applications, databases, or files located within the data center 150. To facilitate remote access to secure applications and files, a secure network connection can be established using a virtual private network (VPN). A VPN connection can allow a remote computing device, such as computing device 154, to securely access data from a private network (e.g., from a company file server or mail server) using an unsecure public network or the Internet. The VPN connection can require client-side software (e.g., running on the remote computing device) to establish and maintain the VPN connection. The VPN client software can provide data encryption and encapsulation prior to the transmission of secure private network traffic through the Internet.

In some embodiments, the storage appliance 170 can manage the extraction and storage of virtual machine snapshots associated with different point-in-time versions of one or more virtual machines running within the data center 150. A snapshot of a virtual machine can correspond with a state of the virtual machine at a particular point in time. In response to a restore command from the server 160, the storage appliance 170 can restore a point-in-time version of a virtual machine or restore point-in-time versions of one or more files located on the virtual machine and transmit the restored data to the server 160. In response to a mount command from the server 160, the storage appliance 170 can allow a point-in-time version of a virtual machine to be mounted and allow the server 160 to read and/or modify data associated with the point-in-time version of the virtual machine. To improve storage density, the storage appliance 170 can deduplicate and compress data associated with different versions of a virtual machine and/or deduplicate and compress data associated with different virtual machines. To improve system performance, the storage appliance 170 can first store virtual machine snapshots received from a virtualized environment in a cache, such as a flash-based cache. The cache can also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file can comprise a forward incremental file or a reverse incremental file. A forward incremental file can include a set of data representing changes that have occurred since an earlier point-in-time snapshot of a virtual machine. To generate a snapshot of the virtual machine corresponding with a forward incremental file, the forward incremental file can be combined with an earlier point-in-time snapshot of the virtual machine (e.g., the forward incremental file can be combined with the last full image of the virtual machine that was captured before the forward incremental file was captured and any other forward incremental files that were captured subsequent to the last full image and prior to the forward incremental file). A reverse incremental file can include a set of data representing changes from a later point-in-time snapshot of a virtual machine. To generate a snapshot of the virtual machine corresponding with a reverse incremental file, the reverse incremental file can be combined with a later point-in-time snapshot of the virtual machine (e.g., the reverse incremental file can be combined with the most recent snapshot of the virtual machine and any other reverse incremental files that were captured prior to the most recent snapshot and subsequent to the reverse incremental file).

The storage appliance 170 can provide a user interface (e.g., a web-based interface or a graphical user interface) that displays virtual machine backup information such as identifications of the virtual machines protected and the historical versions or time machine views for each of the virtual machines protected. A time machine view of a virtual machine can include snapshots of the virtual machine over a plurality of points in time. Each snapshot can comprise the state of the virtual machine at a particular point in time. Each snapshot can correspond with a different version of the virtual machine (e.g., Version 1 of a virtual machine can correspond with the state of the virtual machine at a first point in time and Version 2 of the virtual machine can correspond with the state of the virtual machine at a second point in time subsequent to the first point in time).

The user interface can enable an end user of the storage appliance 170 (e.g., a system administrator or a virtualization administrator) to select a particular version of a virtual machine to be restored or mounted. When a particular version of a virtual machine has been mounted, the particular version can be accessed by a client (e.g., a virtual machine, a physical machine, or a computing device) as if the particular version was local to the client. A mounted version of a virtual machine can correspond with a mount point directory (e.g., /snapshots/VM5/Version23). In one example, the storage appliance 170 can run an NFS server and make the particular version (or a copy of the particular version) of the virtual machine accessible for reading and/or writing. A user (e.g., virtual machine administrator or end user of a virtual machine) of the storage appliance 170 can then select the particular version to be mounted and run an application (e.g., a data analytics application) using the mounted version of the virtual machine. In another example, the particular version can be mounted as an iSCSI target.

In some embodiments, the storage appliance 140 is an external network connected database appliance comprising an agent 142, an application 144, and a storage device 146. In some embodiments, the application 144 is a software application that uses (e.g., consumes) files from a target set of files stored locally on storage device 146, or on remote storage locations, such as within data center 150. The agent 142 is a remote connection system for generating data snapshots of a target set of files used by the storage appliance 140, and can further implement bootstrapping, upgrade, and further include backup features to transfer data from the storage appliance 140 to data center 150 via networks 180.

In some embodiments, the agent 142 can be uploaded from the data center 150 and installed on the storage appliance 140. After installation on storage appliance 140, the agent 142 can be enabled or disabled by the storage appliance 140 over time. The agent 142 can acquire one or more electronic files or data snapshot information associated with the one or more electronic files from the application 144. The data snapshot information can include full and/or differential snapshot data. Depending on the embodiment, the agent 142 can facilitate the server 160 obtaining metadata for a file of (the target set of files accessible by) the storage appliance 140 (e.g., to determine whether the file has changed since the last data snapshot), and the agent 142 can facilitate the server 160 obtaining changed data detected for the file (e.g., changed data blocks or file metadata since the last data snapshot).

The agent 142 can transfer one or more changed data blocks or changed file metadata corresponding with the first point in time version of a file to the storage appliance 140. The one or more changed data blocks or changed file metadata can be identified by the agent 142 by generating and comparing fingerprints or signatures for data blocks or file metadata of the file with previously generated fingerprints or signatures associated with earlier point in time versions of the file captured prior to the first point in time. In some embodiments, the agent 142 can perform automatic upgrades or downgrades the agent 142 to be in-sync with software changes to a plurality of nodes (e.g., nodes operating within storage appliance 170).

In some embodiments, the agent 142 is further configured to interface with application 144 or storage device 146 to implement changes, such as creating directories, database instances, reads/writes, and other operations to provide data management functions between the storage appliance 140 and devices within the data center 150.

Figure 1B:
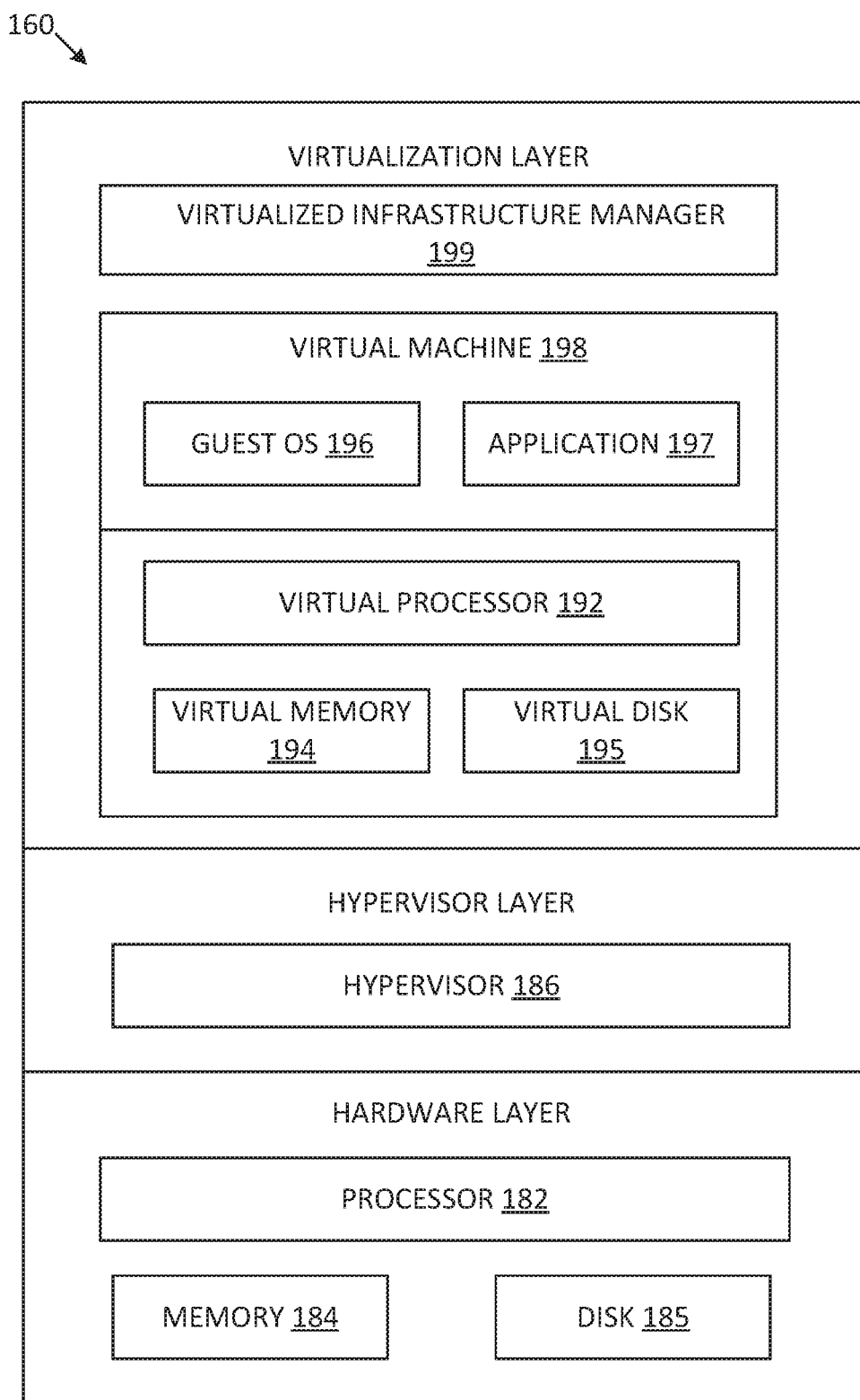
FIG. 1B is a block diagram illustrating an example of a server, according to some embodiments of the present disclosure.

FIG. 1B is a block diagram illustrating an example of a server, according to some embodiments of the present disclosure. In particular, FIG. 1B depicts an example of the server 160 in FIG. 1A. The server 160 can comprise one server out of a plurality of servers that are networked together within a data center. In one example, the plurality of servers can be positioned within one or more server racks within a data center (e.g., data center 150). As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 can comprise a native hypervisor or a hosted hypervisor. The hypervisor 186 can provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 can comprise a file stored within the one or more disks 185. In one example, a virtual machine can include a plurality of virtual disks, with each virtual disk of the plurality of virtual disks associated with a different file stored on the one or more disks 185. Virtual machine 198 can include a guest operating system 196 that runs one or more applications, such as application 197.

The virtualized infrastructure manager 199, which can correspond with the virtualization manager 169 in FIG. 1A, can run on a virtual machine or natively on the server 160. The virtualized infrastructure manager 199 can provide a centralized platform for managing a virtualized infrastructure that includes a plurality of virtual machines. The virtualized infrastructure manager 199 can manage the provisioning of virtual machines running within the virtualized infrastructure and provide an interface to computing devices interacting with the virtualized infrastructure. The virtualized infrastructure manager 199 can perform various virtualized infrastructure-related tasks, such as cloning virtual machines, creating new virtual machines (e.g., new virtual machines for new nodes of the cluster), monitoring the state of virtual machines, and facilitating backups of virtual machines.

In one embodiment, the server 160 can use the virtualized infrastructure manager 199 to facilitate backups for a plurality of virtual machines (e.g., eight different virtual machines) running on the server 160. Each virtual machine running on the server 160 can run its own guest operating system and its own set of applications. Each virtual machine running on the server 160 can store its own set of files using one or more virtual disks associated with the virtual machine (e.g., each virtual machine can include two virtual disks that are used for storing data associated with the virtual machine).

In one embodiment, a data management application running on a storage appliance, such as storage appliance 140 in FIG. 1A or storage appliance 170 in FIG. 1A, can request a snapshot of a virtual machine running on server 160. The snapshot of the virtual machine can be stored as one or more files, with each file associated with a virtual disk of the virtual machine. A snapshot of a virtual machine can correspond with a state of the virtual machine at a particular point in time. The particular point in time can be associated with a time stamp. In one example, a first snapshot of a virtual machine can correspond with a first state of the virtual machine (including the state of applications and files stored on the virtual machine) at a first point in time (e.g., 5:30 p.m. on Jun. 29, 2024) and a second snapshot of the virtual machine can correspond with a second state of the virtual machine at a second point in time subsequent to the first point in time (e.g., 5:30 p.m. on Jun. 30, 2024).

In response to a request for a snapshot of a virtual machine at a particular point in time, the virtualized infrastructure manager 199 can set the virtual machine into a frozen state or store a copy of the virtual machine at the particular point in time. The virtualized infrastructure manager 199 can then transfer data associated with the virtual machine (e.g., an image of the virtual machine or a portion of the image of the virtual machine) to the storage appliance. The data associated with the virtual machine can include a set of files including a virtual disk file storing contents of a virtual disk of the virtual machine at the particular point in time and a virtual machine configuration file storing configuration settings for the virtual machine at the particular point in time. The contents of the virtual disk file can include the operating system used by the virtual machine, local applications stored on the virtual disk, and user files (e.g., images and word processing documents). In some cases, the virtualized infrastructure manager 199 can transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 can transfer a portion of an image of the virtual machine associated with data that has changed since an earlier point in time prior to the particular point in time or since a last snapshot of the virtual machine was taken. In one example, the virtualized infrastructure manager 199 can transfer only data associated with virtual blocks stored on a virtual disk of the virtual machine that have changed since the last snapshot of the virtual machine was taken. In one embodiment, the data management application can specify a first point in time and a second point in time and the virtualized infrastructure manager 199 can output one or more virtual data blocks associated with the virtual machine that have been modified between the first point in time and the second point in time.

In some embodiments, the server 160 or the hypervisor 186 can communicate with a storage appliance, such as storage appliance 140 in FIG. 1A or storage appliance 170 in FIG. 1A, using a distributed file system protocol such as Network File System (NFS) Version 3. The distributed file system protocol can allow the server 160 or the hypervisor 186 to access, read, write, or modify files stored on the storage appliance as if the files were locally stored on the server 160. The distributed file system protocol can allow the server 160 or the hypervisor 186 to mount a directory or a portion of a file system located within the storage appliance 140. For example, the storage appliance 140 can include a standalone host of a database, where the server 160 mounts the database directories as if the files were locally stored on server 160. Further, the server 160 can function as a backup device for storage appliance 140 by backing up data in the mounted directories in a distributed database within data center 150, such as a cluster of nodes in storage appliance 170.

Figure 1C:
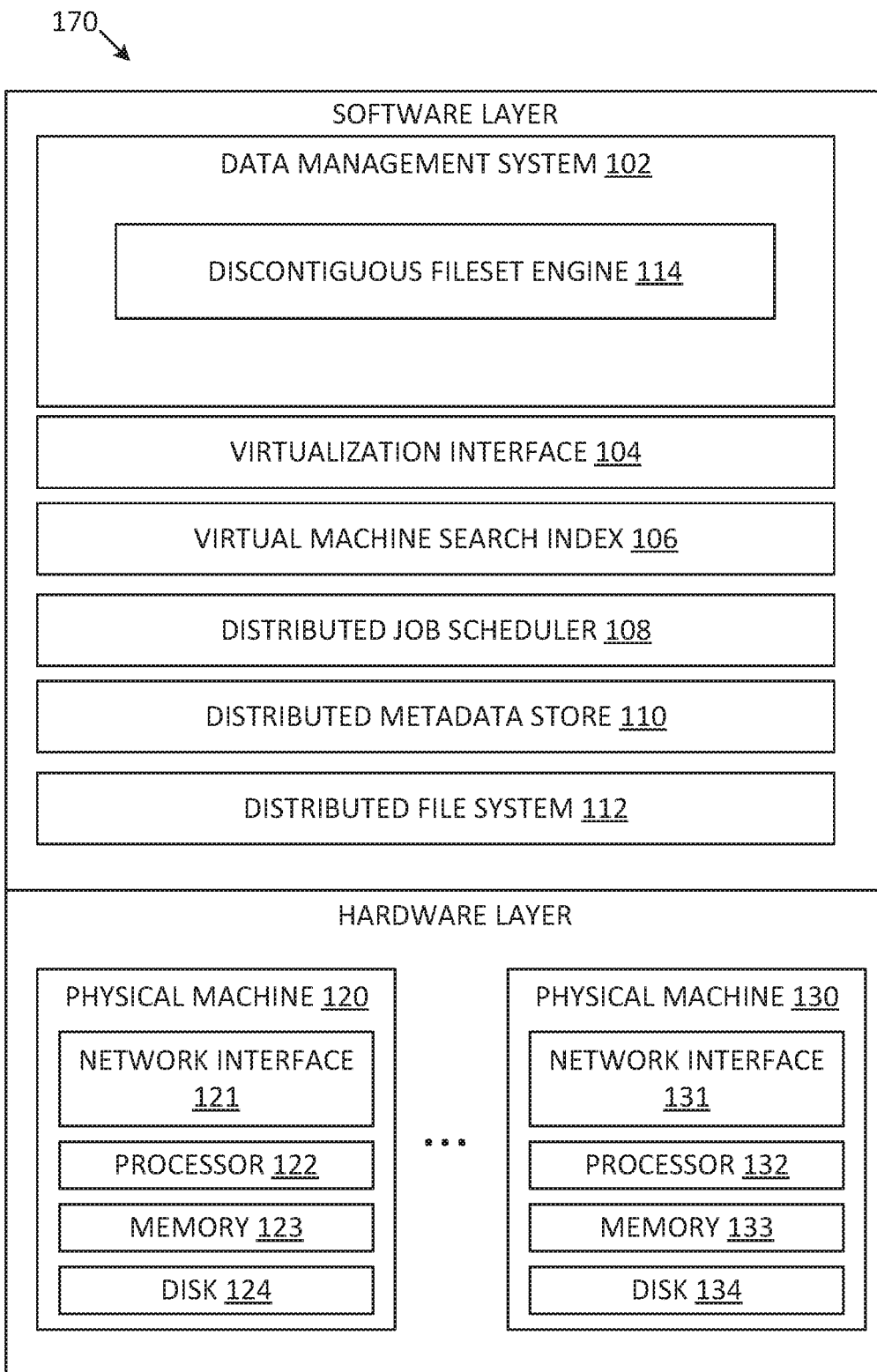
FIG. 1C is a block diagram illustrating an example of a storage appliance, according to some embodiments of the present disclosure.

FIG. 1C is a block diagram illustrating an example of a storage appliance, according to some embodiments of the present disclosure. In particular, FIG. 1C depicts an example of the storage appliance 170 in FIG. 1A. The storage appliance 170 can comprise a plurality of physical machines that can be grouped together and presented as a single computing system. Each physical machine of the plurality of physical machines can comprise a node in a cluster (e.g., a failover cluster). In one example, the storage appliance 170 can be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer-readable instructions stored in memory 123 to perform processes described herein. Disk 124 can include a hard disk drive and/or a solid-state drive. The physical machine 130 includes a network interface 131, processor 132, memory 133, and disk 134 all in communication with each other. Processor 132 allows physical machine 130 to execute computer-readable instructions stored in memory 133 to perform processes described herein. Disk 134 can include a hard disk drive and/or a solid-state drive. In some cases, disk 134 can include a flash-based SSD or a hybrid HDD/SSD drive. In one embodiment, the storage appliance 170 can include a plurality of physical machines arranged in a cluster (e.g., eight machines in a cluster). Each of the plurality of physical machines can include a plurality of multi-core CPUs, 128 GB of RAM, a 500 GB SSD, four 4 TB HDDs, and a network interface controller.

In some embodiments, the plurality of physical machines can be used to implement a cluster-based network file server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster can be connected to each other via a network and can be associated with one or more IP addresses (e.g., two different IP addresses can be assigned to each node). In one example, each node in the cluster can be assigned a permanent IP address and a floating IP address and can be accessed using either the permanent IP address or the floating IP address. In this case, a hypervisor, such as hypervisor 186 in FIG. 1B, can be configured with a first floating IP address associated with a first node in the cluster. The hypervisor 186 can connect to the cluster using the first floating IP address. In one example, the hypervisor 186 can communicate with the cluster using the NFS Version 3 protocol. Each node in the cluster can run a Virtual Router Redundancy Protocol (VRRP) daemon. A daemon can comprise a background process. Each VRRP daemon can include a list of all floating IP addresses available within the cluster. In the event that the first node associated with the first floating IP address fails, one of the VRRP daemons can automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster can assume the first floating IP address that is used by the hypervisor 186 for communicating with the cluster.

In order to determine which of the other nodes in the cluster will assume the first floating IP address, a VRRP priority can be established. In one example, given a number (N) of nodes in a cluster from node(0) to node(N−1), for a floating IP address (i), the VRRP priority of node(j) can be (j−i) modulo N. In another example, given a number (N) of nodes in a cluster from node(0) to node(N−1), for a floating IP address (i), the VRRP priority of node(j) can be (i−j) modulo N. In these cases, node(j) will assume floating IP address (i) only if its VRRP priority is higher than that of any other node in the cluster that is alive and announcing itself on the network. Thus, if a node fails, then there can be a clear priority ordering for determining which other node in the cluster will take over the failed node's floating IP address.

In some cases, a cluster can include a plurality of nodes and each node of the plurality of nodes can be assigned a different floating IP address. In this case, a first hypervisor can be configured with a first floating IP address associated with a first node in the cluster, a second hypervisor can be configured with a second floating IP address associated with a second node in the cluster, and a third hypervisor can be configured with a third floating IP address associated with a third node in the cluster.

As depicted in FIG. 1C, the software-level components of the storage appliance 170 can include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 can be run using a dedicated hardware-based appliance. In another embodiment, the software-level components of the storage appliance 170 can be run from the cloud (e.g., the software-level components can be installed on a cloud service provider).

In some cases, the data storage across a plurality of nodes in a cluster (e.g., the data storage available from the one or more physical machines) can be aggregated and made available over a single file system namespace (e.g., /snapshots/). A directory for each virtual machine protected using the storage appliance 170 can be created (e.g., the directory for Virtual Machine A can be /snapshots/VM_A). Snapshots and other data associated with a virtual machine can reside within the directory for the virtual machine. In one example, snapshots of a virtual machine can be stored in subdirectories of the directory (e.g., a first snapshot of Virtual Machine A can reside in /snapshots/VM_A/s1/ and a second snapshot of Virtual Machine A can reside in /snapshots/VM_A/s2/).

The distributed file system 112 can present itself as a single file system, in which as new physical machines or nodes are added to the storage appliance 170, the cluster can automatically discover the additional nodes and automatically increase the available capacity of the file system 112 for storing files and other data. Each file stored in the distributed file system 112 can be partitioned into one or more chunks or shards. Each of the one or more chunks can be stored within the distributed file system 112 as a separate file. The files stored within the distributed file system 112 can be replicated or mirrored over a plurality of physical machines, thereby creating a load-balanced and fault-tolerant distributed file system 112. In one example, storage appliance 170 can include ten physical machines arranged as a failover cluster and a first file corresponding with a snapshot of a virtual machine (e.g., /snapshots/VM_A/s1/s1.full) can be replicated and stored on three of the ten machines.

The distributed metadata store 110 can include a distributed database management system that provides high availability without a single point of failure. In one embodiment, the distributed metadata store 110 can comprise a database, such as a distributed document-oriented database. The distributed metadata store 110 can be used as a distributed key value storage system. In one example, the distributed metadata store 110 can comprise a distributed NoSQL key value store database. In some cases, the distributed metadata store 110 can include a partitioned row store, in which rows are organized into tables or other collections of related data held within a structured format within the key value store database. A table (or a set of tables) can be used to store metadata information associated with one or more files stored within the distributed file system 112. The metadata information can include the name of a file, a size of the file, file permissions associated with the file, when the file was last modified, and file mapping information associated with an identification of the location of the file stored within a cluster of physical machines. In one embodiment, a new file corresponding with a snapshot of a virtual machine can be stored within the distributed file system 112 and metadata associated with the new file can be stored within the distributed metadata store 110. The distributed metadata store 110 can also be used to store a backup schedule for the virtual machine and a list of snapshots for the virtual machine that are stored using the storage appliance 170.

In some cases, the distributed metadata store 110 can be used to manage one or more versions of a virtual machine. Each version of the virtual machine can correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine can correspond with a plurality of files. The plurality of files can include a single full image snapshot of the virtual machine and one or more incrementals derived from the single full image snapshot. The single full image snapshot of the virtual machine can be stored using a first storage device of a first type (e.g., a HDD) and the one or more incrementals derived from the single full image snapshot can be stored using a second storage device of a second type (e.g., an SSD). In this case, only a single full image needs to be stored and each version of the virtual machine can be generated from the single full image or the single full image combined with a subset of the one or more incrementals. Furthermore, each version of the virtual machine can be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 108 can be used for scheduling backup jobs that acquire and store virtual machine snapshots for one or more virtual machines over time. The distributed job scheduler 108 can follow a backup schedule to back up an entire image of a virtual machine at a particular point in time or one or more virtual disks associated with the virtual machine at the particular point in time. In one example, the backup schedule can specify that the virtual machine be backed up at a snapshot capture frequency, such as every two hours or every 24 hours. Each backup job can be associated with one or more tasks to be performed in a sequence. Each of the one or more tasks associated with a job can be run on a particular node within a cluster. In some cases, the distributed job scheduler 108 can schedule a specific job to be run on a particular node based on data stored on the particular node. For example, the distributed job scheduler 108 can schedule a virtual machine snapshot job to be run on a node in a cluster that is used to store snapshots of the virtual machine in order to reduce network congestion.

The distributed job scheduler 108 can comprise a distributed fault-tolerant job scheduler, in which jobs affected by node failures are recovered and rescheduled to be run on available nodes. In one embodiment, the distributed job scheduler 108 can be fully decentralized and implemented without the existence of a master node. The distributed job scheduler 108 can run job scheduling processes on each node in a cluster or on a plurality of nodes in the cluster. In one example, the distributed job scheduler 108 can run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes can store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 108 can undo and restart the failed jobs on available nodes within the cluster.

The job scheduling processes running on at least a plurality of nodes in a cluster (e.g., on each available node in the cluster) can manage the scheduling and execution of a plurality of jobs. The job scheduling processes can include run processes for running jobs, cleanup processes for cleaning up failed tasks, and rollback processes for rolling-back or undoing any actions or tasks performed by failed jobs. In one embodiment, the job scheduling processes can detect that a particular task for a particular job has failed and in response can perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes can restart the particular job on an available node in the cluster.

The distributed job scheduler 108 can manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system can be returned to a state as if none of the series of tasks were ever performed. The series of tasks can correspond with an ordering of tasks for the series of tasks and the distributed job scheduler 108 can ensure that each task of the series of tasks is executed based on the ordering of tasks. Tasks that do not have dependencies with each other can be executed in parallel.

In some cases, the distributed job scheduler 108 can schedule each task of a series of tasks to be performed on a specific node in a cluster. In other cases, the distributed job scheduler 108 can schedule a first task of the series of tasks to be performed on a first node in a cluster and a second task of the series of tasks to be performed on a second node in the cluster. In these cases, the first task can have to operate on a first set of data (e.g., a first file stored in a file system) stored on the first node and the second task can have to operate on a second set of data (e.g., metadata related to the first file that is stored in a database) stored on the second node. In some embodiments, one or more tasks associated with a job can have an affinity to a specific node in a cluster.

In one example, if the one or more tasks require access to a database that has been replicated on three nodes in a cluster, then the one or more tasks can be executed on one of the three nodes. In another example, if the one or more tasks require access to multiple chunks of data associated with a virtual disk that has been replicated over four nodes in a cluster, then the one or more tasks can be executed on one of the four nodes. Thus, the distributed job scheduler 108 can assign one or more tasks associated with a job to be executed on a particular node in a cluster based on the location of data required to be accessed by the one or more tasks.

In one embodiment, the distributed job scheduler 108 can manage a first job associated with capturing and storing a snapshot of a virtual machine periodically (e.g., every 30 minutes). The first job can include one or more tasks, such as communicating with a virtualized infrastructure manager, such as the virtualized infrastructure manager 199 in FIG. 1B, to create a frozen copy of the virtual machine and to transfer one or more chunks (or one or more files) associated with the frozen copy to a storage appliance, such as storage appliance 170 in FIG. 1A. The one or more tasks can also include generating metadata for the one or more chunks, storing the metadata using the distributed metadata store 110, storing the one or more chunks within the distributed file system 112, and communicating with the virtualized infrastructure manager 199 that the frozen copy of the virtual machine can be unfrozen or released from a frozen state. The metadata for a first chunk of the one or more chunks can include information specifying a version of the virtual machine associated with the frozen copy, a time associated with the version (e.g., the snapshot of the virtual machine was taken at 5:30 p.m. on Jun. 29, 2024), and a file path to where the first chunk is stored within the distributed file system 112 (e.g., the first chunk is located at snapshots/VM_B/s1/s1.chunk1). The one or more tasks can also include deduplication, compression (e.g., using a lossless data compression algorithm such as LZ4 or LZ77), decompression, encryption (e.g., using a symmetric key algorithm such as Triple DES or AES-256), and decryption-related tasks.

The virtualization interface 104 can provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 can communicate with the virtualized infrastructure manager using an API for accessing the virtualized infrastructure manager (e.g., to communicate a request for a snapshot of a virtual machine). In this case, storage appliance 170 can request and receive data from a virtualized infrastructure without requiring agent software to be installed or running on virtual machines within the virtualized infrastructure. The virtualization interface 104 can request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine can be transferred to the storage appliance. However, if the snapshot of the virtual machine is not the first snapshot taken of the virtual machine, then only the data blocks of the virtual machine that have changed since a prior snapshot was taken can be transferred to the storage appliance.

The virtual machine search index 106 can include a list of files that have been stored using a virtual machine and a version history for each of the files in the list. Each version of a file can be mapped to the earliest point-in-time snapshot of the virtual machine that includes the version of the file or to a snapshot of the virtual machine that includes the version of the file (e.g., the latest point-in-time snapshot of the virtual machine that includes the version of the file). In one example, the virtual machine search index 106 can be used to identify a version of the virtual machine that includes a particular version of a file (e.g., a particular version of a database, a spreadsheet, or a word processing document). In some cases, each of the virtual machines that are backed up or protected using storage appliance 170 can have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata can include information for locating and retrieving each file from the virtual disk. The metadata can also include a name of a file, the size of the file, the last time at which the file was modified, and a content checksum for the file. Each file that has been added, deleted, or modified since a previous snapshot was captured can be determined using the metadata (e.g., by comparing the time at which a file was last modified with a time associated with the previous snapshot). Thus, for every file that has existed within any of the snapshots of the virtual machine, a virtual machine search index can be used to identify when the file was first created (e.g., corresponding with a first version of the file) and at what times the file was modified (e.g., corresponding with subsequent versions of the file). Each version of the file can be mapped to a particular version of the virtual machine that stores that version of the file.

In some cases, if a virtual machine includes a plurality of virtual disks, then a virtual machine search index can be generated for each virtual disk of the plurality of virtual disks. For example, a first virtual machine search index can catalog and map files located on a first virtual disk of the plurality of virtual disks and a second virtual machine search index can catalog and map files located on a second virtual disk of the plurality of virtual disks. In this case, a global file catalog or a global virtual machine search index for the virtual machine can include the first virtual machine search index and the second virtual machine search index. A global file catalog can be stored for each virtual machine backed up by a storage appliance within a file system, such as distributed file system 112 in FIG. 1C.

The data management system 102 may comprise an application running on the storage appliance (e.g., storage appliance 170) that manages and stores one or more snapshots of a virtual machine. In one example, the data management system 102 may comprise a highest-level layer in an integrated software stack running on the storage appliance. For some embodiments, the data management system 102 comprises a discontiguous fileset engine 114, which can enable the data management system 102 to perform various methodologies described herein, such as classifying each file in a target set of files into one of two or more discontiguous filesets based on one or more factors, such as frequency of file change or purpose of existence. The integrated software stack may include the data management system 102, the virtualization interface 104, the distributed job scheduler 108, the distributed metadata store 110, and the distributed file system 112.

In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point-in-time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

FIGS. 2 through 7 are flowcharts illustrating example methods of managing files according to categories, in accordance with some embodiments. It will be understood that example methods described herein may be performed by one or more machines (e.g., physical or virtual machines), such as a computing device executing instructions associated with an alert system described herein with respect to some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a machine (e.g., physical machine 120), cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Figure 2:
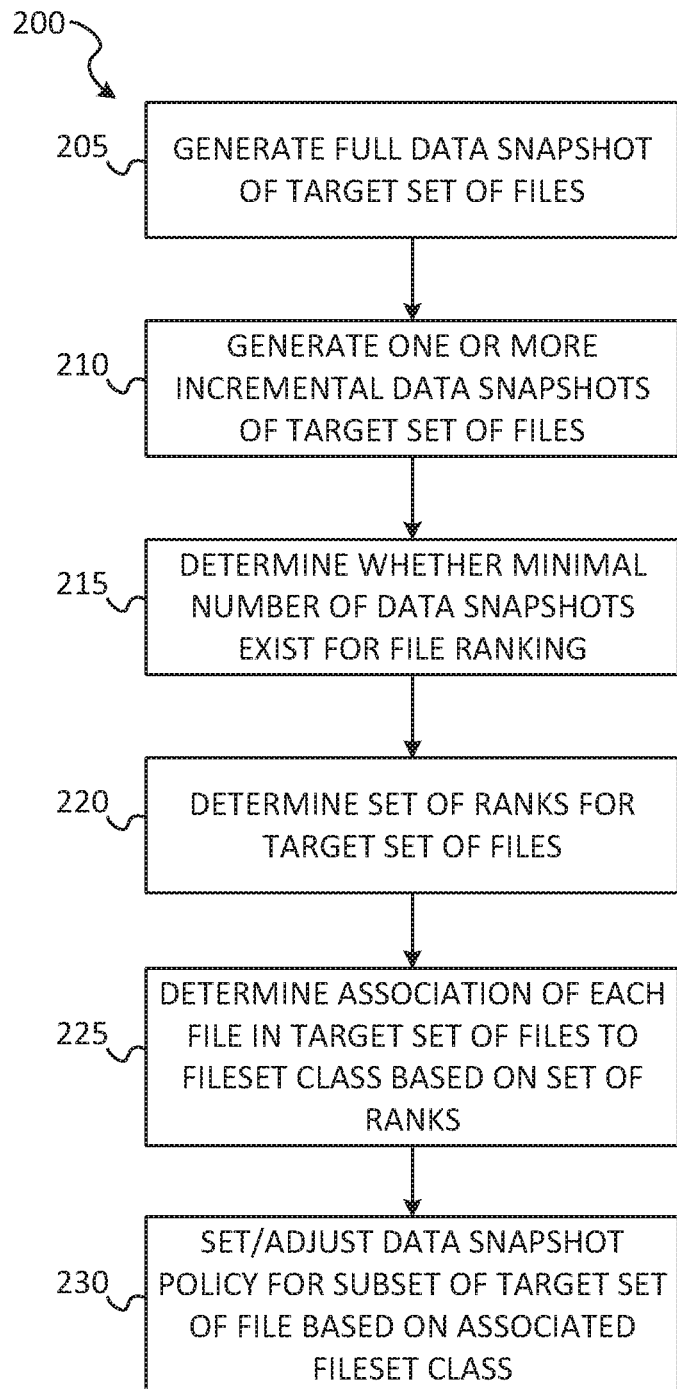
FIGS. 2 through 7 are flowcharts illustrating example methods of managing files according to categories, in accordance with some embodiments.

Referring now to FIG. 2, the flowchart illustrates the example method 200 for generating data snapshots of one or more files according to fileset classes, in accordance with some embodiments. The method 200 as illustrated begins with operation 205 generating a full data snapshot of a target set of files being data protected. For some embodiments, operation 205 is performed as part of initially starting data protection of the target set of files.

The method 200 continues with operation 210 generating one or more incremental data snapshots of the target set of files over time. As noted herein, when data protection initially starts for the target set of files, each of the files can be associated with an initial fileset class (e.g., one of fileset classes A, B, or C, such as the one associated with an SLA), which can determine the initial frequency at which incremental data snapshots are generated for the target set of files. Accordingly, the one or more incremental data snapshots can be generated over time according to this initial frequency of the initial fileset class. According to some embodiments described herein, the initial frequency for some of the files of the target set of files can change once those files are associated with another fileset class (e.g., a fileset class other than the initial fileset class). For example, as described herein, after a sufficient sample size of incremental data snapshots have been generated for the target set of files, the frequency of data content change of files in the target set of files can be determined, the frequency of data content change of the files can determine their respective ranks, their respective ranks can determine their respective associations with fileset classes, and their respective associations with fileset classes can determine their respective incremental data snapshot generation frequency.

For some embodiments, generation of a single incremental data snapshot of a given fileset (e.g., all files of a target set of files or of a discontiguous fileset) comprises obtaining metadata for each individual file in the given fileset to detect whether the individual file (e.g., its data content) has changed. The metadata for a given file can comprise one or more attributes (e.g., mtime, size, etc.) of the given file that can determine whether data content (e.g., a data block or file metadata) of the file has changed. The metadata for a given file can be obtained, for example, by way of a stat( ) system call or the like.

As described herein, frequency of change of a file is determined based on a sample of prior incremental data snapshots. According to some embodiments, each file has an associated change count (e.g., stored in its metadata) that can be updated (e.g., incremented by one) each time an incremental data snapshot process determines that the file has changed (e.g., based on file metadata scan). For some embodiments, the change count of each file is reset (e.g., to 0) after a specific sample space (e.g., sample space of 10 incremental data snapshots) has ended.

The method 200 continues with operation 215 determining whether a minimal number of data snapshots (e.g., incremental data snapshots) exists for determining change frequency of files (in the target set of files) for file ranking purposes. For instance, for some embodiments, the sufficient minimal sample size can comprise ten incremental data snapshots, where the ten incremental data snapshots do not necessarily need to be generated consecutively (e.g., a full data snapshot may or may not be generated between generation of two of the ten incremental data snapshots). For some embodiments, the sample size for determining frequency of change of a given file is limited to the last x number (e.g., last ten) of incremental data snapshots. Alternatively, for some embodiments, the sample size for determining frequency of change of a given file comprises all prior incremental data snapshots.

The method 200 continues with operation 220 determining a set of ranks for the target set of files, where the set of ranks can include a corresponding rank for each file in the target set of files. As described herein, rank of a file can be determined based on one or more factors (ranking factors), such as frequency of change in data content of the file (e.g., one or more incremental data snapshots), purpose of existence of the file (e.g., significance rank of software applications that use the file), or some combination thereof.

For instance, a rank of a given file can be determined based on one or more of the following. Frequency of change of a specific file X (of the target set of files) can be designated as F(X), where (Equation 1):

$$F(X) = \frac{\left(\begin{array}{c}\text{number of times change detected for } X \\ \text{over set of incremental data snapshots}\end{array}\right)}{\left(\begin{array}{c}\text{total number of incremental data snapshots} \\ \text{in set of incremental data snapshots}\end{array}\right)}$$

For some embodiments, a change count maintained for the specific file X (e.g., maintained in its metadata) can be used to determine the number of times a file change is detected for file X over the set of incremental data snapshots. For some embodiments, the specific file X is reset (e.g., to 0) after a specific sample space (e.g., sample space of 10 incremental data snapshots) has ended. The set of incremental data snapshots can include those existing incremental data snapshots (e.g., all prior incremental data snapshots or only the last ten incremental data snapshots) that are being considered for ranking the file X.

Percentage frequency of change for a specific file X (of the target set of files) can be designed as PF(X), where (Equation 2):

$$PF(X) = F(X) \times 100$$

The percentage frequency of change for the specific file. X can represent the overall change to the file X over the set of incremental data snapshots.

Percentile frequency of change for a specific file X (of the target set of files) can be designed as PT(X), where (Equation 3):

$$PT(X) = \frac{\left(\begin{array}{c}\text{number of other files within target set of files} \\ \text{having a frequency less than } F(X)\end{array}\right)}{(\text{total number of files in target set of files})} \times 100$$

The percentile frequency of change for the specific file X can represent the overall change to the file X (over the set of incremental data snapshots being considered) with respect to (e.g., relative or in comparison to) all other files within the target set of files.

Significance rank of a software application consuming a specific file X (of the target set of files) can be represented as S(X). Depending on the embodiment, the significance rank of a particular software application can range from 1 (e.g., most important) to a numbers, where s can depend on the implementation (e.g., s can represent the number of software applications being considered). For instance, a database software application can have an assigned significance rank of 1, and a web server software application can have an assigned significance rank of 2. The significance rank of a software application can be user defined (e.g., defined by a data management administrator in the data management system 102). The last value s can represent the lowest significance rank value possible, and can be defined as a default value (e.g., assigned where the software application that consumes that specific file X is unknown or is of the least importance).

Based on the foregoing, the rank of a specific file X (of the target set of files) can be designated as R(X), where (Equation 4):

$$R(\text{file}) = \left(\frac{PF(X)}{2}\right) + \left(\frac{PT(X)}{4}\right) + \left(W - \left(\frac{S(X)}{(N+1)}\right)\right)$$

where W can equal a constant factor (e.g., one determined to be suitable for an implementation, such as 25) and N represents the total number of software applications having a significance rank (e.g., in the data management system 102). For some embodiments, a rank generated by the equation above is subject to an upper bound of 100. Depending on the embodiment, the equation above can be modified to generate a rank that is subject to a lower bound value or a different upper bound value (e.g., one that is less than or more than 100).

The method 200 continues with operation 225 determining association of each file in the target set of files to a fileset class based on the set of ranks determined by operation 220. For some embodiments, each fileset class is associated with a range of ranks (e.g., exclusive ranges of ranks). A given file (in the target set of files) can be associated with a given fileset class in response to a rank of the given file falling within the range of ranks associated with the given fileset class. For example, as described herein, the possible fileset classes can comprise fileset class A, fileset class B, and fileset class C, where each fileset class can be associated with (e.g., represent) a different discontiguous fileset. The fileset class A can be associated with ranks ranging from 50 to 100, the fileset class B can be associated with ranks ranging from 10 to less than 50, and the fileset class C can be associated with ranks less than 10. Fileset class A can be associated with files subject to frequent generation of incremental data snapshots, such as log files, database files, or software application-generated files. Fileset class B can be associated with files subject to less frequent generation of incremental data snapshots, such as software application configuration files. Fileset class C can be associated with files subject to even less frequent generation of incremental data snapshots, such as library files (e.g., files in /lib or /usr/local/lib directories) or software application binary files.

For some embodiments, each file in the target set of files is periodically classified (or re-classified) to a fileset class by periodically determining (or re-determining) a rank for each file and associating each file with a fileset class based on the newly determined rank (which may or may not remain unchanged for a given file). Accordingly, the newly determined rank for a given file can be demoted or promoted from being associated with its current fileset class to another fileset class, or remain associated with its current fileset class. The periodic classification can be performed, for example, prior to, during, or after generation of an incremental data snapshot.

The method 200 continues with operation 230 setting or adjusting (e.g., modifying) a data snapshot policy with respect to a subset of files, of the target set of files, based on a file set class associated with the subset of files. For example, fileset class B can be associated with a base frequency for generating incremental data snapshots (e.g., as defined by a SLA), fileset class A can be associated with a frequency that is a constant x higher than the base frequency, and fileset class C can be associated with a frequency that is a constant y lower than the base frequency. Accordingly, the data snapshot policy can be adjusted such that: files (of the target set of files) associated with a fileset class B have data snapshots (e.g., incremental data snapshots) generated at the base frequency; files (of the target set of files) associated with a fileset class A have data snapshots (e.g., incremental data snapshots) generated at a frequency that is x higher than the base frequency; and files (of the target set of files) associated with a fileset class C have data snapshots (e.g., incremental data snapshots) generated at a frequency that is y lower than the base frequency. For some embodiments, the data snapshot policy is periodically set or adjusted based on the periodic classification of files with fileset classes.

Figure 3:
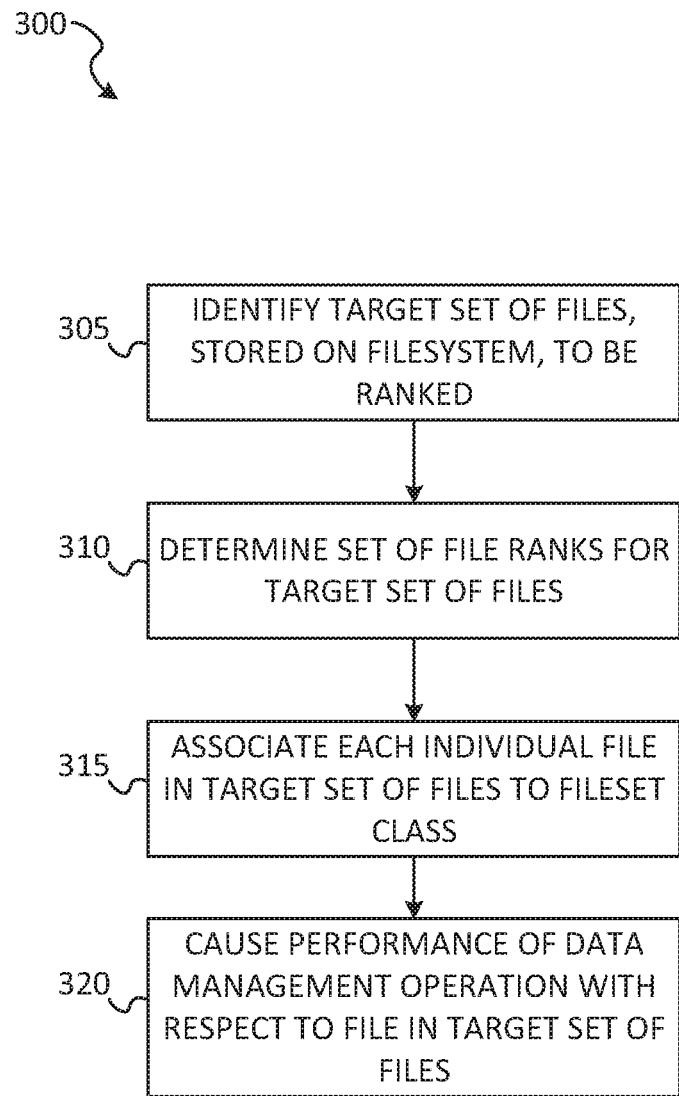

Referring now to FIG. 3, the flowchart illustrates the example method 300 for performing a data management operation on one or more files according to fileset classes, in accordance with some embodiments. Depending on the embodiment, some or all of the method 300 is performed as part of a data snapshot generation process (e.g., incremental data snapshot process). The method 300 as illustrated begins with operation 305 identifying a target set of files, stored on a filesystem, to be ranked. For some embodiments, operation 305 comprises identifying the target set of files based on a user input (e.g., from an end user of a virtual machine or a data management administrator) that identifies a directory (e.g., root directory of a virtual machine) for data management (e.g., protection by data snapshots). The user can, for example identify the directory by way of a graphical user interface, such as a web-based graphical user interface. Additionally, for some embodiments, identifying the target set of files to be ranked comprises identifying each file stored on the file system that meets or exceeds a minimal sample size for determining frequency of file data change. For instance, for data snapshot generation purposes, the target set of files may not be identified by operation 305 until the files in the target set have been examined (for data change) a minimum number of times by a data snapshot process (e.g., for generating an incremental data snapshot).

The method 300 continues with operation 310 determining a set of file ranks for the target set of files identified at operation 305. For some embodiments, operation 310 comprises ranking each file in the target set of files based on a set of ranking factors, which can include a frequency of file data change or an association of the file with a software application (e.g., that uses or consumes the file). For instance, operation 310 can comprise determining how many times the given file changed over a set of prior data snapshots (e.g., to determine level of change between prior data snapshots). For some embodiments, this determination for the given file is performed over a predetermined number of prior data snapshots (e.g., ten prior incremental data snapshots). With respect to a software application, the software application can be associated with a significance rank (e.g., user defined or known by a data management system), which can be considered in determining the rank of the file.

The method 300 continues with operation 315 associating each individual file, in the target set of files, to a given fileset class from a plurality of fileset classes. For some embodiments, an individual file is associated to a given fileset class based on a respective file rank (from the set of file ranks determined at operation 310) for the individual file and based on a given range of ranks associated with the given fileset class (e.g., the respective file rank falls within the given range of ranks). As described herein, each fileset class of the plurality of fileset classes can be associated with a different range of ranks (e.g., range of ranks that do not overlap). For some embodiments, a file in the target set of files is only associated with a single fileset class at a given time. Additionally, for some embodiments, each file in the target set of files can be initially associated (e.g., prior to operation 315) with an initial or default fileset class from the plurality of fileset classes.

The method 300 continues with operation 320 causing performance of a data management operation with respect to a particular file in the target set of files. For some embodiments, operation 320 comprises causing performance of the data management operation with respect to the particular file based on an association of the particular file to a particular fileset class from the plurality of fileset classes. Additionally, for some embodiments, operation 320 comprises adjusting, based on the association of the particular file to the particular fileset class, policy data that determines performance of the data management operation with respect to at least the particular file. As described herein, for some embodiments, the data management operation caused to be performed comprises performing a data snapshot generation process (also referred to herein as a data snapshot process) with respect to the particular file in the target set of files.

Figure 4:
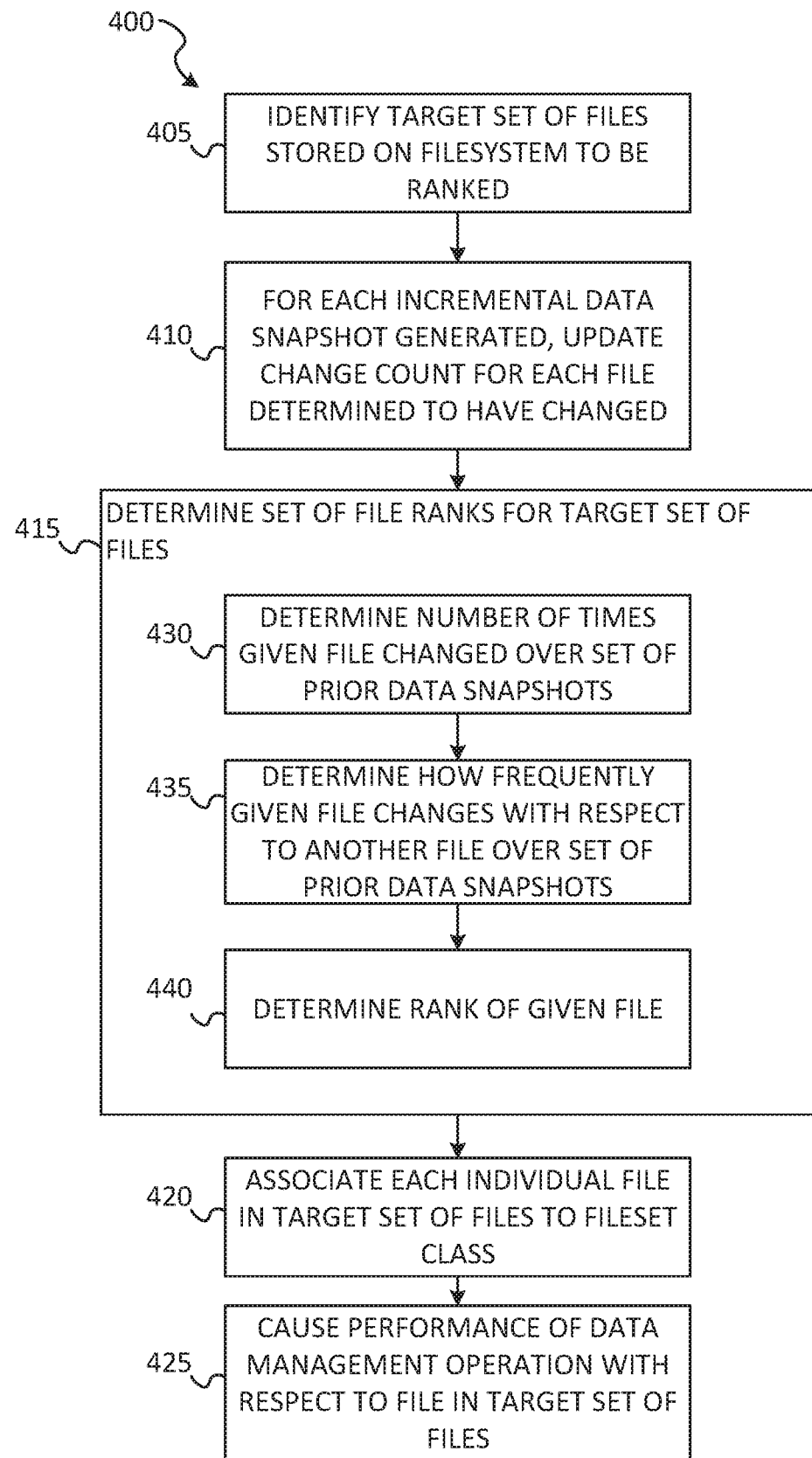

Referring now to FIG. 4, the flowchart illustrates the example method 400 for performing a data management operation on one or more files according to fileset classes, in accordance with some embodiments. Depending on the embodiment, some or all of the method 400 is performed as part of a data snapshot generation process (e.g., incremental data snapshot process). The method 400 as illustrated begins with operation 405, which according to some embodiments is similar to operation 305 described above with respect to the method 300 described above with respect to FIG. 3.

The method 400 continues with operation 410 where, for each incremental data snapshot generated, operation 410 updates (e.g., increments by a value, such as one) a change count for each file determined to have changed for the incremental data snapshot. Depending on the embodiment, with respect to a data snapshot process (e.g., incremental data snapshot process) performed on a given file, the change count of the given file can be updated as part of the data snapshot process, can be performed after the data snapshot process has completed, or can be performed just before the data snapshot process is performed (e.g., performed at a frequency based on a data snapshot policy associated with the given file).

The method 400 continues with operation 415 determining a set of file ranks for the target set of files identified at operation 405. For some embodiments, operation 415 comprises performing operations 430 through 440 with respect to each given file in the target set of files. As illustrated, operation 430 comprises determining a number of times a given file in the target set of files has changed over a set of prior data snapshot (e.g., existing incremental data snapshots). As described herein, for some embodiments, determining how many times a given file changed over a set of data snapshots can be based on a change count of the given file (as updated by operation 410). For instance, operation 430 can use Equation 1, Equation 2, or both as described herein to determine how many times the given file changed over the set of data snapshots. Operation 435 comprises determining how frequently the given file has changed with respect to another file (e.g., relative or in comparison to all other files) in the target set of files. For instance, operation 435 can use Equation 3 as described herein to determine how frequently the given file has changed with respect to all other files in the target set of files.

Operation 440 comprises determining a rank of the given file based at least on one of: the number of times the given file has changed over a set of prior data snapshot (as determined by operation 430), how frequently the given file has changed with respect to another file in the target set of files (as determined by operation 435), and a significance rank of a software application associated with (e.g., that uses or consumes) the given file.

For instance, operation 440 can use Equation 4 as described herein to determine the rank of the given file based on the number of times the given file has changed over a set of prior data snapshots, how frequently the given file has changed with respect to all other files in the target set of files, and significance rank of a software application associated with the given file.

The method 400 continues with operations 420 and 425, which are respectively similar to operations 315 and 320 of the method 300 described above with respect to FIG. 3.

Figure 5:
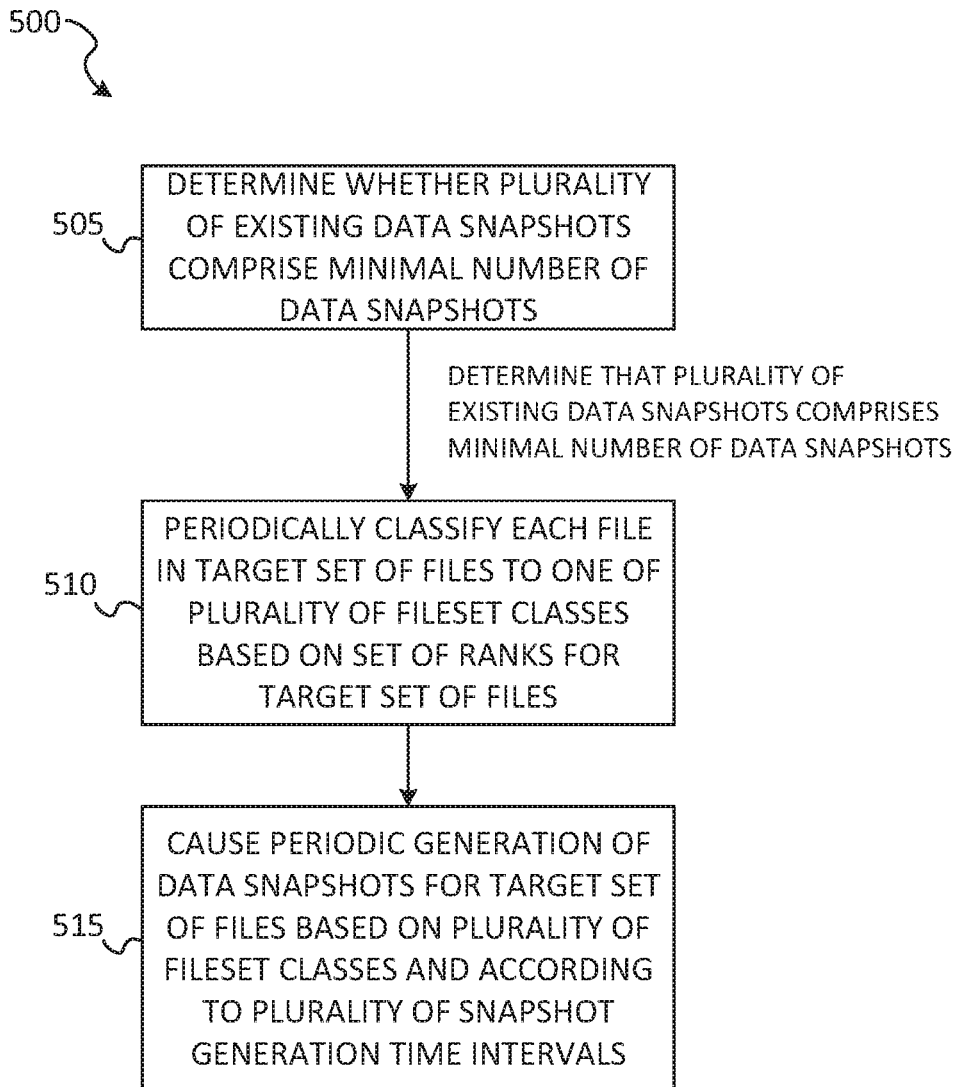

Referring now to FIG. 5, the flowchart illustrates the example method 500 for generating data snapshots of one or more files according fileset classes, in accordance with some embodiments. The method 500 as illustrated begins with operation 505 determining whether a plurality of existing data snapshots comprises a minimal number of data snapshots for the target set of files.

The method 500 continues with operation 510 periodically classifying each file in the target set of files to one of a plurality of fileset classes based on a set of file ranks for the target set of files. For some embodiments, each fileset class of the plurality of fileset classes is associated with a different time interval in a plurality of snapshot generation time intervals. For some embodiments, operation 510 comprises periodically determining the set of file ranks of the target set of files by ranking each file in the target set of files based on a set of ranking factors, where the set of ranking factors comprises a frequency of file data change. Additionally, for some embodiments, operation 510 further comprises periodically associating each file in the target set of files to a given fileset class (from the plurality of fileset classes) based on a respective file rank from the set of file ranks and based on a given range of ranks associated with the given fileset class. As described herein, each fileset class of the plurality of fileset classes can be associated with a different range of ranks. Each file in the target set of files can be initially associated (e.g., prior to operation 510) with a same fileset class from the plurality of fileset classes. Depending on the embodiment, the operation 510 can be performed after generation of a new data snapshot (e.g., new incremental data snapshot), or prior to generation of a new data snapshot.

The method 500 continues with operation 515 causing periodic generation of data snapshots (e.g., incremental data snapshots) for the target set of files based on the plurality of fileset classes and according to the plurality of snapshot generation time intervals as associated with the target set of files (as classified by operation 510). For example, for each individual fileset class of the plurality of fileset classes, operation 515 can cause periodic generation of a data snapshot (e.g., incremental data snapshot) for a given subset of files of the target set of files according to a given snapshot generation time interval (from the plurality of snapshot generation time intervals), where the given subset of files and the given snapshot generation are associated with the same individual fileset class. For some embodiments, operation 515 comprises adjusting, based on the plurality of fileset classes and according to the plurality of snapshot generation time intervals as associated with the target set of files, policy data that determines periodic generation of data snapshots (e.g., incremental data snapshots) for the target set of files.

As described herein, the plurality of fileset classes can comprise a first fileset class (e.g., fileset class A), a second fileset class (e.g., fileset class B), and a third fileset class (e.g., fileset class C), where the plurality of snapshot generation time intervals comprises a first snapshot generation time interval associated with the first fileset class, a second snapshot generation time interval associated with the second fileset class, and a third snapshot generation time interval associated with the third fileset class. For some embodiments, the first snapshot generation time interval is greater than the second snapshot generation time interval, and the second snapshot generation time interval is greater than the third snapshot generation time interval.

Figure 6:
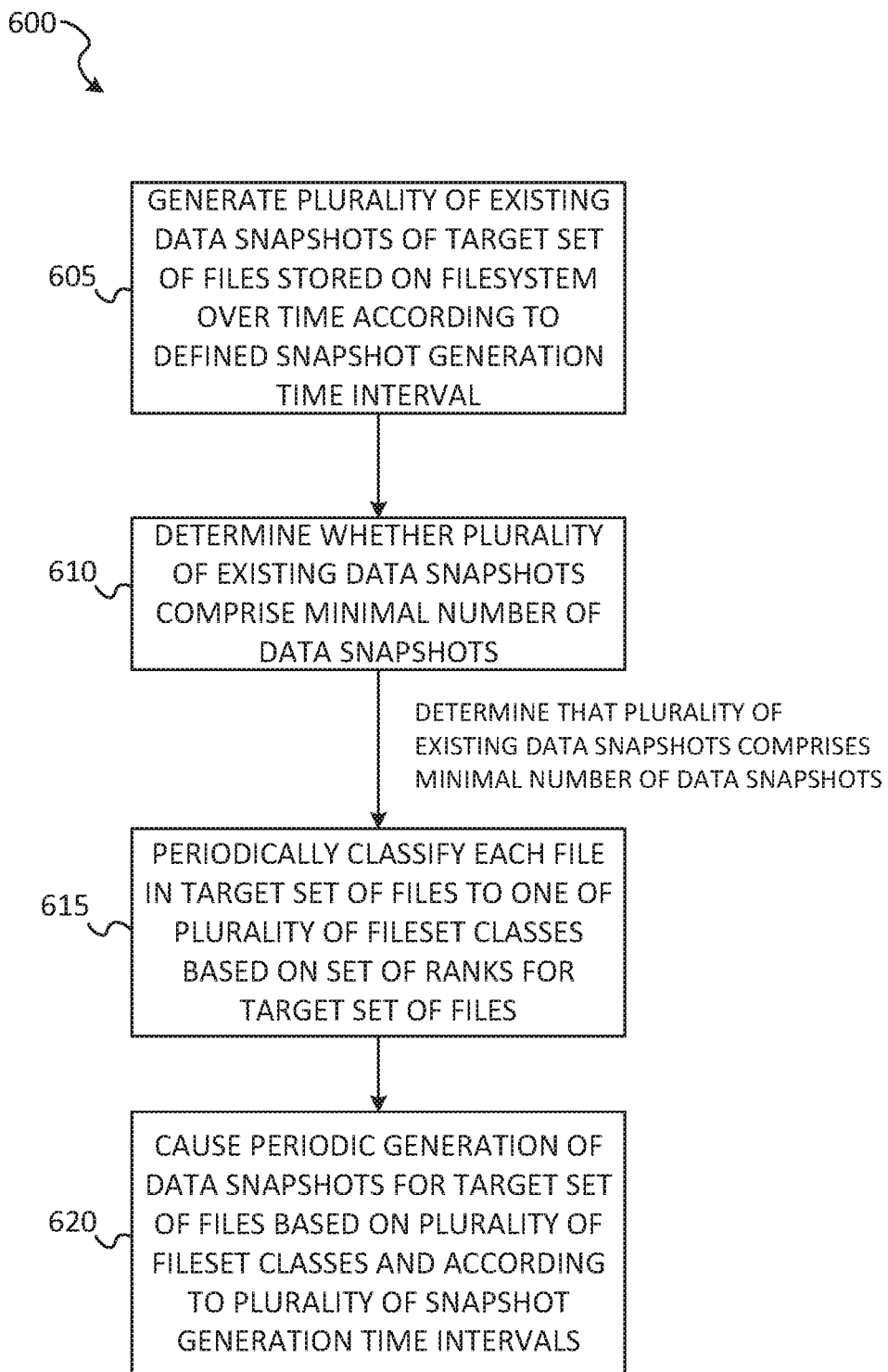

Referring now to FIG. 6, the flowchart illustrates the example method 600 for generating data snapshots of one or more files according to fileset classes, in accordance with some embodiments. The method 600 as illustrated begins with operation 605 generating a plurality of existing data snapshots of a target set of files stored on a file system over time according to a defined snapshot generation time interval (e.g., defined according to a SLA). For various embodiments, a snapshot generation time interval determines a data snapshot frequency.

The method 600 continues with operations 610 through 620, which according to some embodiments are respectively similar to operation 505 through 515 of the method 500 described above with respect to FIG. 5.

Figure 7:
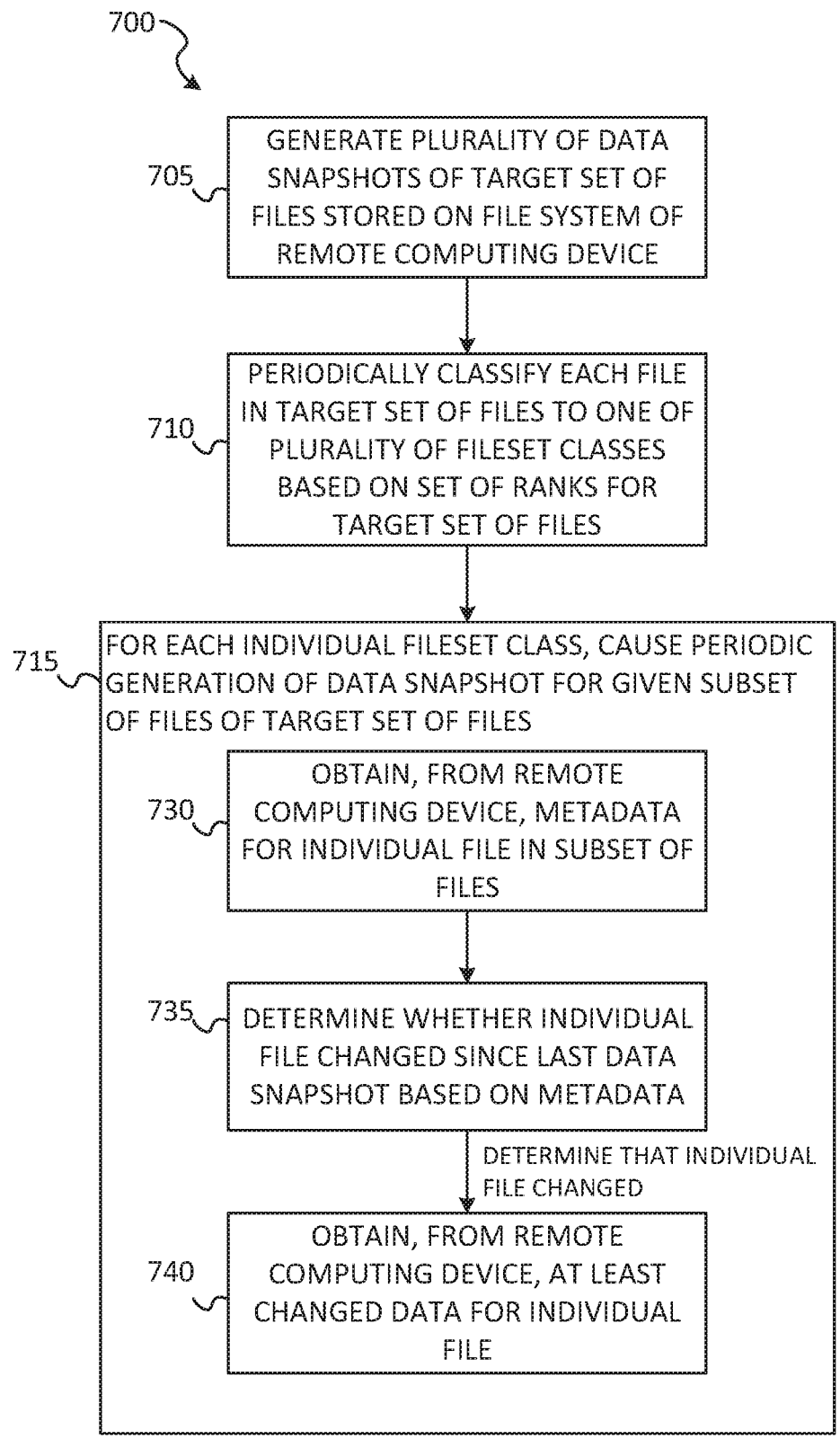

Referring now to FIG. 7, the flowchart illustrates the example method 700 for generating data snapshots of one or more files of a remote computing device (e.g., storage appliance 140 of FIG. 1) according to fileset classes, in accordance with some embodiments. For some embodiments, the method 700 is performed by the server 160. The method 700 as illustrated begins with operation 705 generating a plurality of data snapshots of a target set of files stored on a filesystem of a remote computing device. Depending on the embodiment, the plurality of data snapshots can comprise one or more full data snapshots and one or more incremental data snapshots.

The method 700 continues with operation 710 periodically classifying each file in the target set of files to one of a plurality of fileset classes based on a set of file ranks for the target set of files. For some embodiments, each fileset class of the plurality of fileset classes is associated with a different time interval in a plurality of snapshot generation time intervals. As described herein, a snapshot generation time interval associated with a given fileset class can determine a frequency at which a data snapshot (e.g., an incremental data snapshot) is generated with respect to files associated with the given fileset class.

The method 700 continues with operation 715 for each individual fileset class of the plurality of fileset classes, causing periodic generation of a data snapshot (e.g., an incremental data snapshot) for a given subset of files of the target set of files. For some embodiments, a data snapshot for the given subset of files is periodically generated according to a given snapshot generation time interval (from the plurality of snapshot generation time intervals) that is associated with the same fileset class as the given subset of files. For some embodiments, operation 715 comprises adjusting policy data that determines periodic generation of the incremental data snapshot for the given subset of files.

For some embodiments, operation 715 comprises performing operations 730 through 740 with respect to each given file in the target set of files. As illustrated, operation 730 comprises obtaining, from the remote computing device, metadata for the individual file. For instance, operation 730 can comprise obtaining, from a remote agent installed on the remote computing device, the metadata for the individual file. For some embodiments, the remote agent performs a system call, such as a stat( ) system call, on the individual file to obtain the metadata. Accordingly, operation 730 can comprise sending a set of instructions to the remote computing device (e.g., from the server 160 to the storage appliance 140) that causes the remote computing device to perform a stat( ) system call with respect to the individual file. The remote agent can provide the metadata to the server 160 at the request of the server 160. As described herein, for a data snapshot generation (e.g., an incremental data snapshot generation), each individual file considered can comprise obtaining metadata of the individual file. Operation 735 comprises determining, based on the metadata (obtained at operation 730), whether the individual file changed since a last data snapshot. Operation 740 comprises obtaining, from the remote computing device, at least changed data for the individual file responsive to determining (at operation 735) that the individual file changed since the last data snapshot. For some embodiments, operation 740 comprises obtaining, from a remote agent installed on the remote computing device, the at least changed data (e.g., changed data blocks or changed file metadata) for the individual file.

Figure 8:
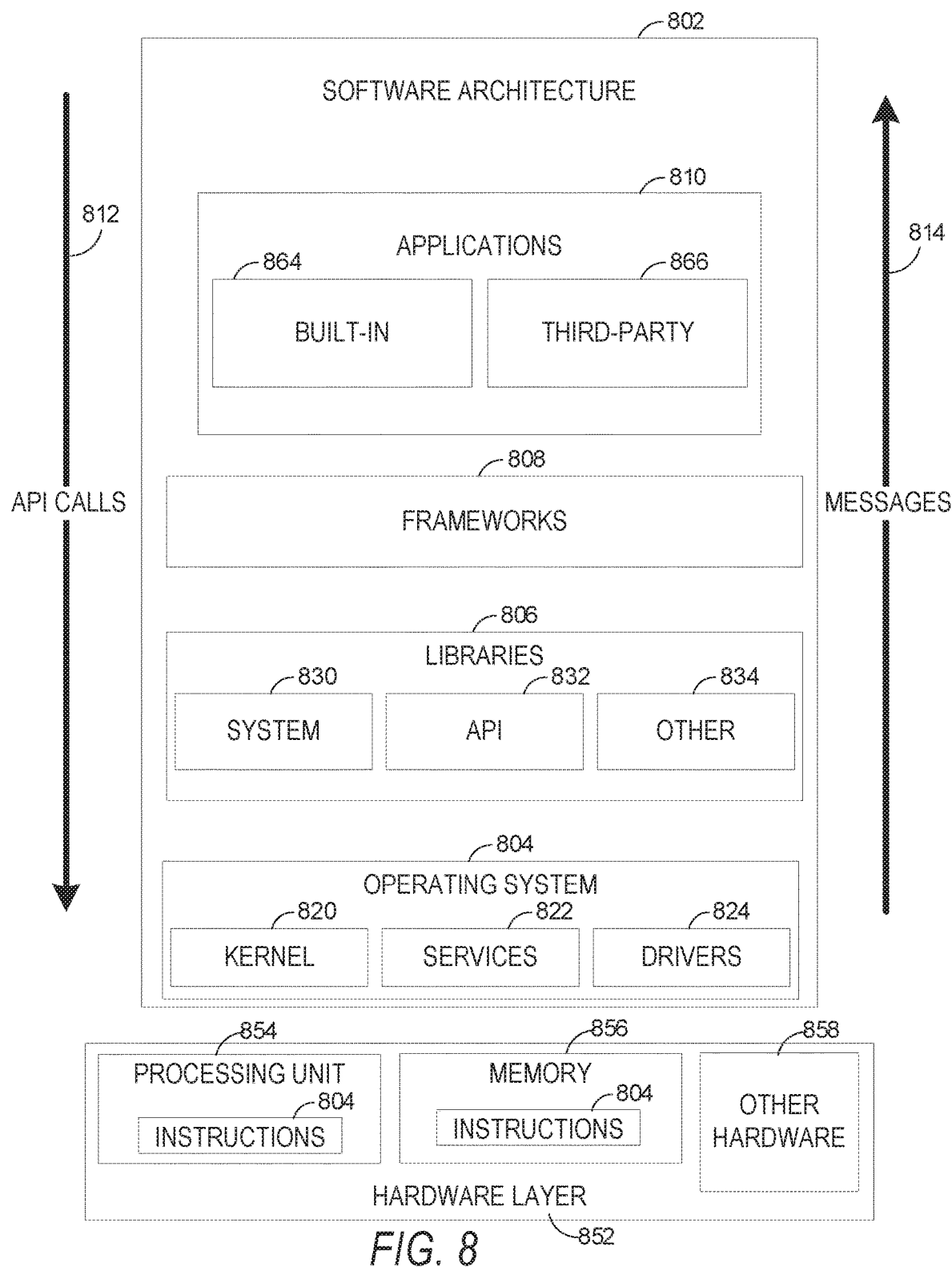
FIG. 8 is a block diagram illustrating an example architecture of software that can be used to implement various embodiments described herein.

FIG. 8 is a block diagram 800 illustrating an example architecture of software 802 that can be used to implement various embodiments described herein. FIG. 8 is merely a non-limiting example of a software architecture, and it will be appreciated that many other architectures can be implemented to facilitate the functionality described herein. In various embodiments, the software 802 is implemented by hardware such as a machine 900 of FIG. 9 that includes processors 910, memory 930, and I/O components 950. In this example architecture, the software 802 can be conceptualized as a stack of layers where each layer may provide a particular functionality. For example, the software 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system or platform.

In some embodiments, the applications 810 include a built-in application 864 and a broad assortment of other applications such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
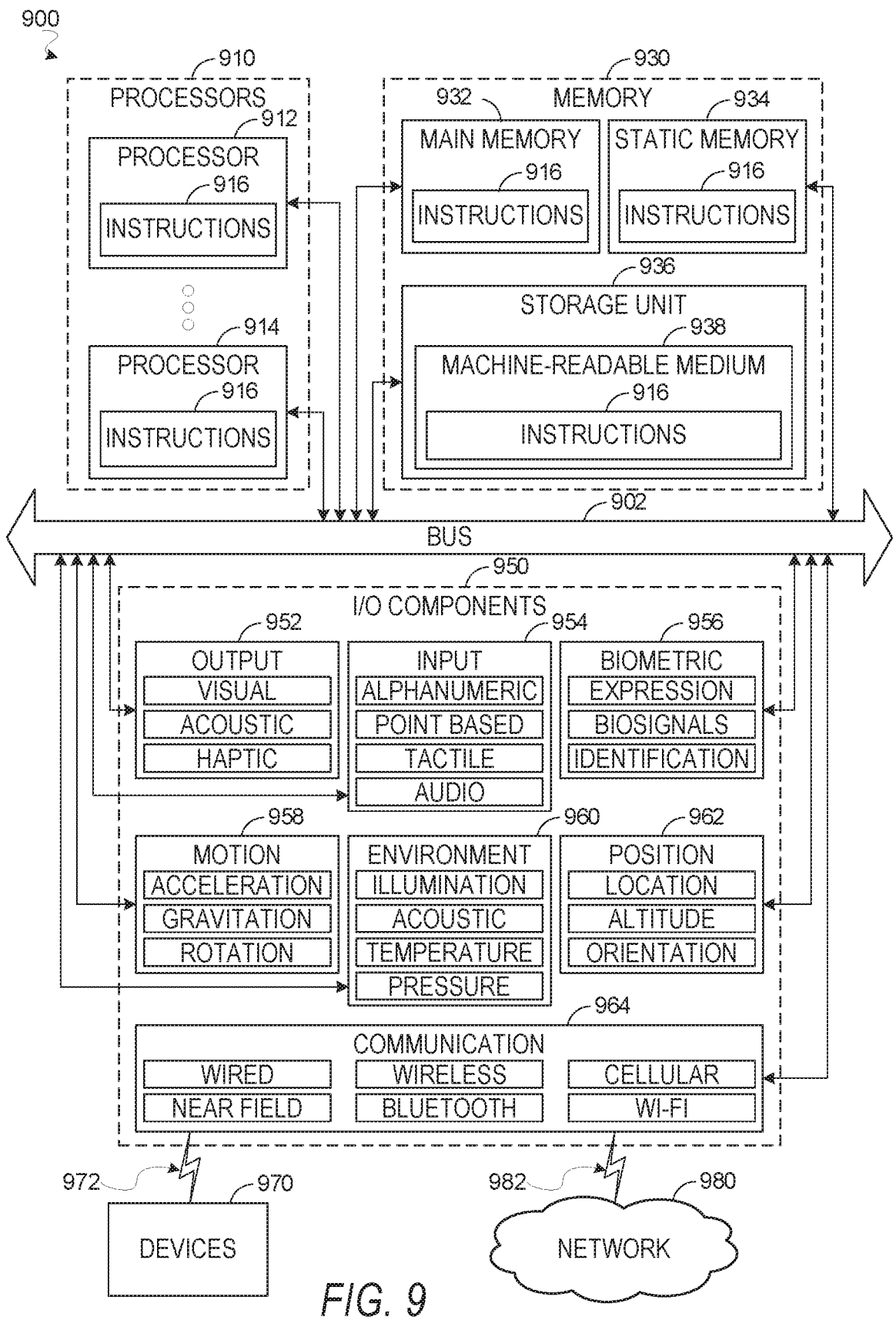
FIG. 9 illustrates a diagrammatic representation of an example machine in the form of a computer system within which a set of instructions may be executed for causing the machine to perform any one or more of the methodologies of various embodiments described herein.

FIG. 9 illustrates a diagrammatic representation of an example machine 900 in the form of a computer system within which a set of instructions may be executed for causing the machine to perform any one or more of the methodologies of various embodiments described herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 200 of FIG. 2. Additionally, or alternatively, the instructions 916 may implement FIGS. 2-7, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In some embodiments, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, both accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

For some embodiments, the operations or features described herein are implemented via a non-transitory computer-readable medium or as a system.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object-oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    identifying, by one or more hardware processors, a target set of files to be ranked, the target set of files being stored on a filesystem;
    determining, by the one or more hardware processors, a set of file ranks for the target set of files by ranking individual files in the target set of files based on a set of ranking factors, the set of ranking factors comprising a frequency of file data change, the ranking of an individual file based on the set of ranking factors comprising:
        determining, based on a number of times the individual file changed over a set of prior data snapshots, how frequently the individual file changes over the set of prior data snapshots relative to how frequently another file changes over the set of prior data snapshots, the individual file and the other file being associated with a same fileset class; and
        determining a given rank of the individual file based on the determination of how frequently the individual file changes over the set of prior data snapshots relative to how frequently the other file changes over the set of prior data snapshots;
    associating, by the one or more hardware processors, individual files in the target set of files to a given fileset class from a plurality of fileset classes based on a respective file rank from the set of file ranks for the individual file and based on a given range of ranks associated with the given fileset class, individual fileset classes of the plurality of fileset classes being associated with a different range of ranks; and
    causing, by the one or more hardware processors, performance of a data management operation with respect to a particular file in the target set of files based on an association of the particular file to a particular fileset class from the plurality of fileset classes.

2. The method of claim 1, wherein the data management operation comprises performing a data snapshot process on the particular file.

3. The method of claim 1, wherein the identifying the target set of files to be ranked comprises:
identifying one or more individual files stored on the filesystem that meet or exceed a minimal sample size for determining frequency of file data change.

4. The method of claim 3, wherein the minimal sample size with respect to a given file comprises a number of times a data snapshot process has examined the given file for generating a data snapshot.

5. The method of claim 1, wherein ranking a given file in the target set of files based on the frequency of file data change comprises:
determining how many times the given file changed over a set of prior data snapshots.

6. The method of claim 1, further comprising:
for an incremental data snapshot generated, updating a change count for one or more individual files determined to have changed for the incremental data snapshot, wherein ranking a given file in the target set of files based on the frequency of file data change comprises:
determining how many times the given file changed over a set of prior data snapshots based on a change count of the given file.

7. The method of claim 1, wherein ranking a given file in the target set of files based on the frequency of file data change comprises:
determining how frequently the given file changes with respect to another file over a set of prior data snapshots, the given file and the other file being associated with a same fileset class.

8. The method of claim 1, wherein the set of ranking factors comprises an association of a given file with a software application.

9. The method of claim 8, wherein the software application is associated with a significance rank.

10. The method of claim 9, wherein the significance rank is user-defined.

11. The method of claim 1, wherein ranking a given file in the target set of files based on the set of ranking factors comprises:
determining the number of times the given file changed over the set of prior data snapshots.

12. The method of claim 1, wherein the frequency of file data change is determined over a predetermined number of prior data snapshots.

13. The method of claim 1, wherein the method is performed as part of a data snapshot process.

14. The method of claim 1, wherein the frequency of file data change is based on a set of prior data snapshots.

15. The method of claim 1, wherein one or more individual files in the target set of files are initially associated with a same fileset class from the plurality of fileset classes.

16. The method of claim 1, wherein the causing performance of the data management operation with respect to the particular file based on the association of the particular file to the particular fileset class comprises:
adjusting, based on the association of the particular file to the particular fileset class, policy data that determines performance of the data management operation with respect to at least the particular file.

17. A system comprising:
a memory storing instructions; and
one or more hardware processors communicatively coupled to the memory and configured by the instructions to perform operations comprising:
identifying a target set of files to be ranked, the target set of files being stored on a filesystem;
determining a set of file ranks for the target set of files by ranking individual files in the target set of files based on a set of ranking factors, the set of ranking factors comprising a frequency of file data change, the ranking of an individual file based on the set of ranking factors comprising:
determining, based on a number of times the individual file changed over a set of prior data snapshots, how frequently the individual file changes over the set of prior data snapshots relative to how frequently another file changes over the set of prior data snapshots, the individual file and the other file being associated with a same fileset class; and
determining a given rank of the individual file based on the determination of how frequently the individual file changes over the set of prior data snapshots relative to how frequently the other file changes over the set of prior data snapshots;
associating individual files in the target set of files to a given fileset class from a plurality of fileset classes based on a respective file rank from the set of file ranks for the individual file and based on a given range of ranks associated with the given fileset class, each fileset class of the plurality of fileset classes being associated with a different range of ranks; and
causing performance of a data management operation with respect to a particular file in the target set of files based on an association of the particular file to a particular fileset class from the plurality of fileset classes.

18. The system of claim 17, wherein the operations further comprise:
for an incremental data snapshot generated, updating a change count for one or more individual files determined to have changed for the incremental data snapshot, wherein ranking a given file in the target set of files based on the frequency of file data change comprises:
determining how many times the given file changed over a set of prior data snapshots based on a change count of the given file.

19. The system of claim 17, wherein the causing the performance of the data management operation with respect to the particular file based on the association of the particular file to the particular fileset class comprises:
adjusting, based on the association of the particular file to the particular fileset class, policy data that determines performance of the data management operation with respect to at least the particular file.

20. A non-transitory computer-readable storage medium comprising instructions that, when executed by a processing device, cause the processing device to perform operations comprising:
identifying a target set of files to be ranked, the target set of files being stored on a filesystem;
determining a set of file ranks for the target set of files by ranking individual files in the target set of files based on a set of ranking factors, the set of ranking factors comprising a frequency of file data change, the ranking of an individual file based on the set of ranking factors comprising:
   determining, based on a number of times the individual file changed over a set of prior data snapshots, how frequently the individual file changes over the set of prior data snapshots relative to how frequently another file changes over the set of prior data snapshots, the individual file and the other file being associated with a same fileset class; and
   determining a given rank of the individual file based on the determination of how frequently the individual file changes over the set of prior data snapshots relative to how frequently the other file changes over the set of prior data snapshots;
associating individual files in the target set of files to a given fileset class from a plurality of fileset classes based on a respective file rank from the set of file ranks for the individual file and based on a given range of ranks associated with the given fileset class; each fileset class of the plurality of fileset classes being associated with a different range of ranks; and
causing performance of a data management operation with respect to a particular file in the target set of files based on an association of the particular file to a particular fileset class from the plurality of fileset classes.

\* \* \* \* \*